US006947670B1

(12) United States Patent
Korotky et al.

(10) Patent No.: US 6,947,670 B1
(45) Date of Patent: Sep. 20, 2005

(54) OPTICAL ADD/DROP ARRANGEMENT FOR RING NETWORKS EMPLOYING WAVELENGTH DIVISION MULTIPLEXING

(75) Inventors: Steven Kenneth Korotky, Toms River, NJ (US); John J. Veselka, Clarksville, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/340,476

(22) Filed: Jun. 30, 1999

(51) Int. Cl.[7] ............................................. H04J 14/02
(52) U.S. Cl. ......................................... 398/59; 398/67
(58) Field of Search ....................... 359/117, 118, 119; 398/67, 4, 55, 79, 59, 341.43; 385/24; 370/217, 370/431

(56) References Cited

U.S. PATENT DOCUMENTS

| 5,625,478 | A | | 4/1997 | Doerr et al. ................. 359/125 |
|---|---|---|---|---|
| 5,647,035 | A | | 7/1997 | Cadeddu et al. ............... 385/24 |
| 5,680,235 | A | | 10/1997 | Johansson .................... 359/110 |
| 5,717,795 | A | | 2/1998 | Sharma et al. ................. 385/24 |
| 5,751,454 | A | | 5/1998 | MacDonald et al. ........ 359/119 |
| 5,760,934 | A | | 6/1998 | Sutter et al. ................. 359/119 |
| 5,771,112 | A | | 6/1998 | Hamel et al. ................. 359/128 |
| 5,774,244 | A | * | 6/1998 | Tandon et al. ............... 359/125 |
| 5,822,095 | A | | 10/1998 | Taga ........................... 359/127 |
| 5,864,414 | A | * | 1/1999 | Barnsley et al. ............... 398/71 |
| 5,875,272 | A | | 2/1999 | Kewitsch et al. ............. 385/37 |
| 5,889,610 | A | * | 3/1999 | Fatehi et al. ................. 359/341 |
| 5,896,212 | A | * | 4/1999 | Sotom et al. ................. 359/125 |
| 5,903,371 | A | * | 5/1999 | Arecco et al. ............... 359/119 |
| 5,986,783 | A | * | 11/1999 | Sharma et al. ............... 359/119 |

(Continued)

FOREIGN PATENT DOCUMENTS

WO    WO 97/06614    2/1997    ............. H04J 3/08

OTHER PUBLICATIONS

Rob Batchellor, "Optical Networking the Ericsson Way", OADM Workshop, Apr. 23-24, 1998, pp. 39-42.

(Continued)

Primary Examiner—Jason Chan
Assistant Examiner—David C. Payne
(74) Attorney, Agent, or Firm—Gregory J. Murgia

(57) ABSTRACT

An add/drop arrangement using broadband optical couplers provides a low-loss, highly flexible add/drop capability for survivable wavelength division multiplexed (WDM) ring networks. At each node in the ring having the broadband optical coupler-based add/drop element, a portion of optical signal power of the entire WDM signal (i.e., all optical channels) is tapped off so that one or more optical channels of particular wavelengths can be dropped at the node. Information (e.g., data) to be added at the node is supplied in an optical channel that is added to the WDM signal via the broadband coupler. Because the add/drop element uses a broadband coupler, another portion of optical signal power of the WDM signal, including any added optical channels, passes through the node onto the ring. Depending on the specific ring topology being used with the broadband coupler-based add/drop arrangement, additional wavelength assignment and handling measures may be required. For example, certain ring topologies may experience interference between optical channels of particular wavelengths due to possible re-circulation of these optical channels beyond the add and drop nodes (e.g., after an optical channel passes its destination node). According to one illustrative embodiment, a node is equipped to perform wavelength conversion and/or wavelength suppression to prevent undesirable re-circulation of optical channels.

33 Claims, 14 Drawing Sheets

U.S. PATENT DOCUMENTS

| | | | | |
|---|---|---|---|---|
| 6,021,233 A | * | 2/2000 | Koehler | 385/24 |
| 6,049,523 A | * | 4/2000 | Anderson et al. | 370/217 |
| 6,137,603 A | * | 10/2000 | Henmi | 359/110 |
| 6,192,173 B1 | * | 2/2001 | Solheim et al. | 385/24 |
| 6,278,536 B1 | * | 8/2001 | Kai et al. | 359/127 |
| 6,307,986 B1 | * | 10/2001 | Duerksen et al. | 385/24 |

OTHER PUBLICATIONS

B. S. Johansson, et al., "Flexible bus: A self-restoring optical ADM ring architecture", Electronics Letters, vol. 32, No. 25, Dec. 5, 1996, pp. 2338-2339.

C. R. Giles, et al., "Low-Loss ADD/DROP Multiplexers for WDM Lightwave Networks", IOOC-95, ThC2-1, pp. 66-67.

Manish Sharma, et al., "WDM Ring Network Using a Centralized Multiwavelength Light Source and Add-Drop Multiplexing Filters", Journal of Lightwave Technology, vol. 15, No. 6, Jun. 1997, pp. 917-929.

Ivan P. Kaminow, et al., "Terrestrial Amplified Lightwave System Design", Optical Fiber Telecommunications IIIA, Academic Press, San Diego, CA (1997), pp. 269-275, and pp. 567-573.

* cited by examiner

100

400

400

400

400

400

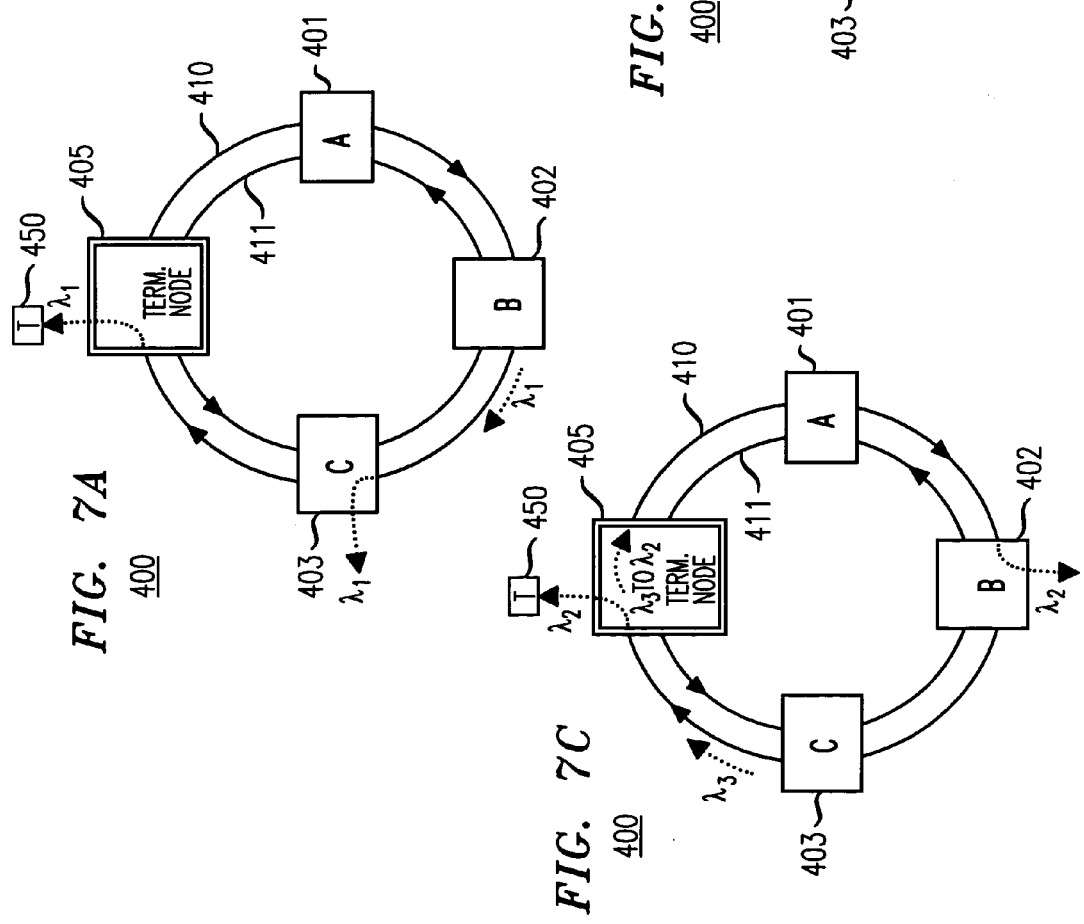

405

650

650

650

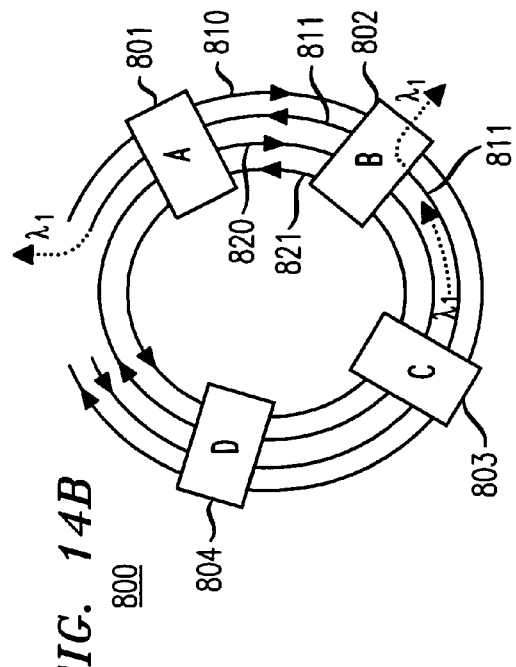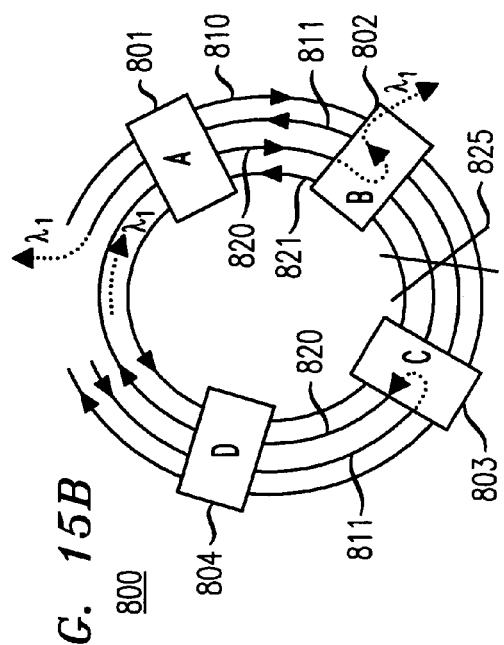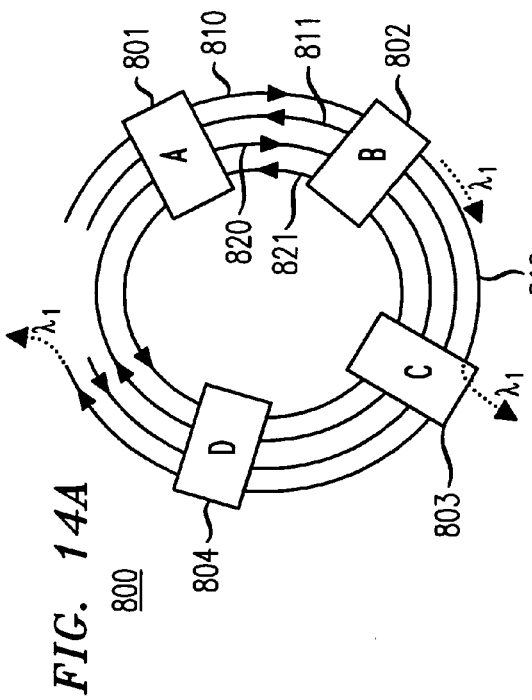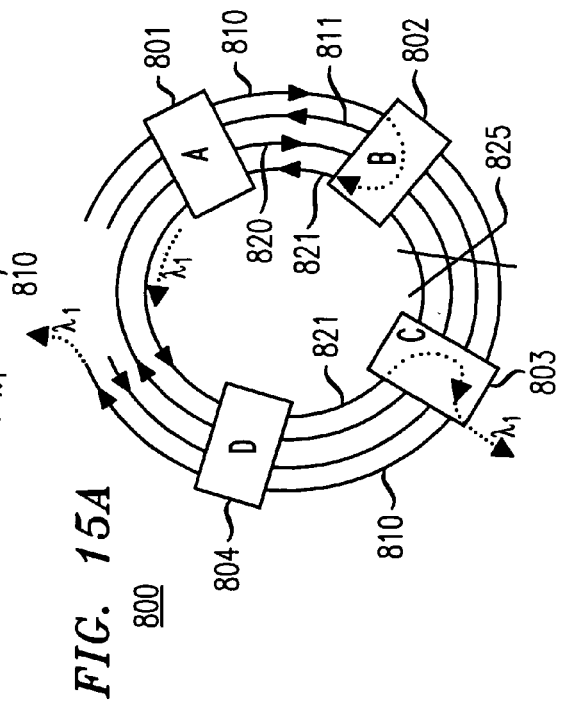

OPTICAL ADD/DROP ARRANGEMENT FOR RING NETWORKS EMPLOYING WAVELENGTH DIVISION MULTIPLEXING

TECHNICAL FIELD

This invention relates generally to lightwave communication networks and, more particularly, to adding and dropping signals in wavelength division multiplexed ring networks.

BACKGROUND OF THE INVENTION

Optical fiber is becoming the transmission medium of choice for communication networks because of the speed and bandwidth advantages associated with optical transmission. Wavelength division multiplexing (WDM), which combines many optical channels at different wavelengths for simultaneous transmission as a composite optical signal in a single optical fiber, is being used to meet the increasing demands for more speed and bandwidth in optical transmission applications. With recent advances in optical networking technology, system manufacturers are now contemplating dense wavelength division multiplexing (DWDM) systems that include, for example, as many as 80 or more optical channels (i.e., wavelengths) in a single fiber. As such, DWDM optical transport technology is revolutionizing the telecommunication industry.

In view of the many advantages associated with the use of WDM and DWDM in long haul networks, WDM and DWDM technology is now being contemplated for use in short haul markets, such as metropolitan area networks and the like. Traditionally, short haul networks have been implemented as Synchronous Optical Network (SONET) rings using time division multiplexing (TDM) and the like. While such SONET rings perform well, the strong and consistent growth in demand for bandwidth and management of that bandwidth has outgrown the capabilities and capacity of SONET rings. As a result, there is a desire to extend, at the lowest cost possible, the enormous capacity and protocol independence of WDM and DWDM into these short haul ring networks.

In particular, there are many incentives for extending deployment of WDM and DWDM to the short haul networks in place of the existing time division multiplexed systems. For example, transport efficiencies can be achieved through deployment of packet or cell-based transport directly onto individual optical channels. Additionally, WDM and DWDM systems provide greater bandwidth and offer more flexibility in managing the dynamic bandwidth requirements of today's users.

However, implementation of WDM or DWDM in metropolitan area networks presents a unique set of challenges as compared to long haul network applications. For example, add/drop requirements are significantly greater in metropolitan area networks as compared to long haul networks because metropolitan area networks are typically more densely populated with users in a more geographically limited area. In addition, flow of traffic, diversity of traffic types, and dynamic changes in traffic levels associated with the adding and dropping of traffic further complicates the management of traffic in the metropolitan area network. Solving these problems using conventional WDM and DWDM techniques, such as those used in long haul applications, adds significant cost and complexity in the more cost-sensitive metropolitan area environment.

For example, conventional approaches to optical add/drop multiplexing are typically based on extracting the entire signal power for a selected wavelength at an add/drop node. Some examples of components used for optical add/drop multiplexing include in-line arrayed waveguide grating routers (AWG), fiber Bragg gratings (FBG), or Mach-Zehnder (MZF) filters, to name a few. However, these devices have several disadvantages that render them undesirable for practical applications in short haul applications, such as ring networks. For example, some of these disadvantages include: wavelength dependent loss; power penalties and other transmission impairments due to bandwidth narrowing and group velocity dispersion; limited spectral bandwidth, poor scalability, and high implementation costs.

In general, the economics of applying DWDM in inter-office (IOF) and access metropolitan applications depend very much on the cost of state-of-the-art optical components, such as optical multiplexers/demultiplexers, optical amplifiers, optical switches, and WDM sources. While the flexibility of bandwidth assignment is a key driver for this application, the cost of providing this capability using straightforward DWDM techniques appears prohibitively expensive for this more cost sensitive environment.

Consequently, a more cost competitive and technologically feasible solution for adding and dropping optical signals is required in order to realize the benefits of WDM or DWDM in metropolitan area networking.

SUMMARY OF THE INVENTION

Cost and optical losses associated with adding and dropping optical channels of a wavelength division multiplexed (WDM) signal in a WDM ring network are substantially reduced over the current art in an add/drop arrangement that uses broadband optical couplers in combination with wavelength conversion and suppression elements. At each node in the WDM ring that includes a broadband optical coupler-based add/drop element, a portion of optical signal power of the entire WDM signal (i.e., all optical channels) is tapped off so that one or more optical channels of particular wavelengths can be dropped at the node. Information (e.g., data) to be added at the node is supplied in an optical channel that is added to the WDM signal via the same broadband coupler. Another portion of optical signal power of the WDM signal (including any added optical channels) passes through the node onto the WDM ring.

According to another aspect of the invention, at least one node in the WDM ring includes wavelength conversion and suppression elements in order to reduce interference between optical channels that may occur as a result of re-circulation of these optical channels in the WDM ring (e.g., after an optical channel passes its destination node). Wavelength conversion and suppression will be different depending on the specific ring topology being used with the broadband coupler-based add/drop arrangement. The add/drop arrangement according to the principles of the invention may be employed in various WDM ring architectures including, but not limited to, path-switched rings and line-switched rings.

The add/drop arrangement according to the principles of the invention uses components that have low optical losses (e.g., low losses in the drop and through paths), operate over a wide spectral bandwidth (e.g., broadband), and rely on passive rather than active techniques, thus reducing the cost and complexity as compared to prior arrangements. Moreover, problems in the prior add/drop arrangements relating to the cascading of band-narrowing filters are avoided by using broadband couplers for adding and dropping optical channels in a WDM ring.

BRIEF DESCRIPTION OF THE DRAWING

A more complete understanding of the present invention may be obtained from consideration of the following detailed description of the invention in conjunction with the drawing, with like elements referenced with like reference numerals, in which:

FIGS. 6A–6D and 7A–7D are simplified network diagrams illustrating the principles of the invention in the context of communications in a UPSR network;

FIGS. 14A–14B and 15A–15B are simplified network diagrams illustrating the principles of the invention in the context of communications in a 4-fiber bi-directional line-switched ring (4F-BLSR) network.

DETAILED DESCRIPTION OF THE INVENTION

For a better understanding of the principles of the invention, an overview of a typical ring network is first provided. In particular, a prototypical WDM ring that includes one or more network elements having optical add/drop capability, e.g., optical add/drop multiplexers will be described. For a general overview of ring networks, including SONET/SDH rings and WDM rings, see, e.g., Kaminow et al., *Optical Fiber Telecommunications*, Vol. IIIA. pp. 269–275 and 567–573 (1997), which is incorporated by reference herein. It should be noted that although the principles of the invention will be described in the context of single ring configurations, the teachings may also be applied to multiple-fiber overlays of survivable WDM rings, e.g., multiple ring architectures. Moreover, although the embodiments are shown and described herein in the context of a 4-node network, the principles of the invention can be applied to a ring network having any number of nodes. As such, the embodiments shown and described herein are meant to be illustrative and not limiting in any way.

Figure 1:
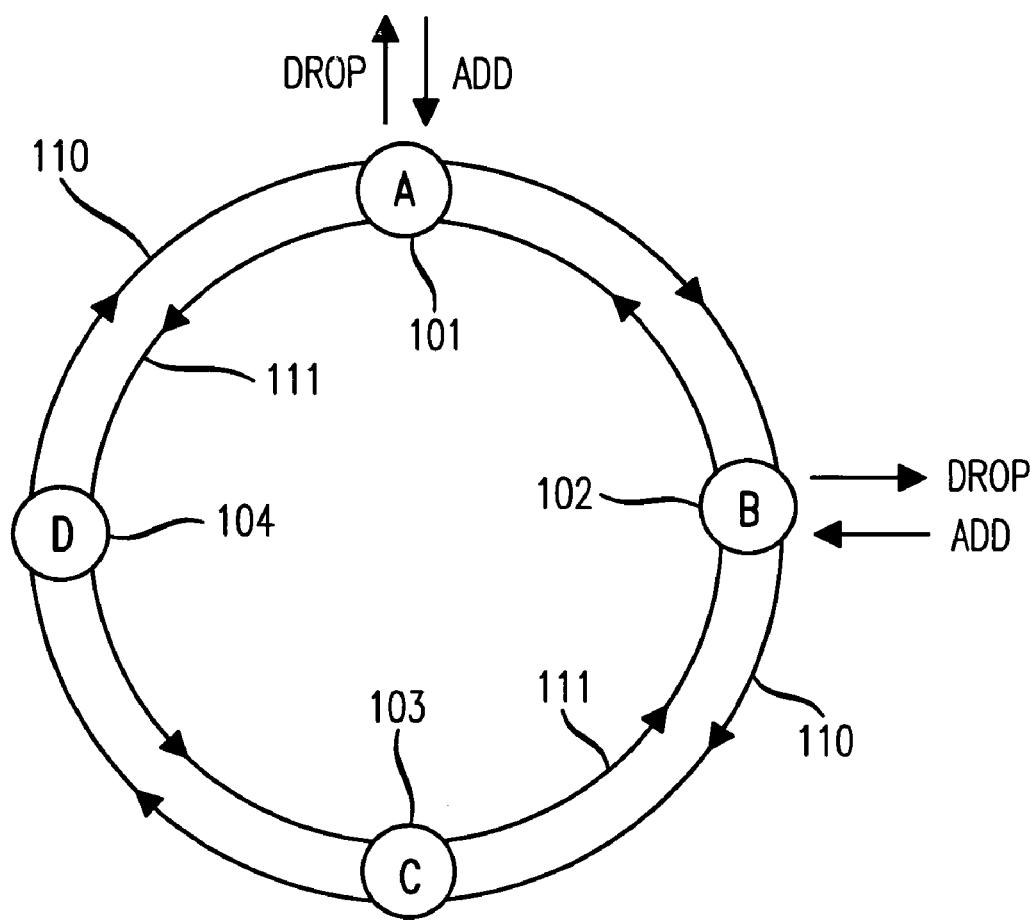
FIG. 1 shows a typical ring network.

FIG. 1 shows a unidirectional path-switched ring (UPSR) 100 including nodes 101–104 (labeled as nodes A through D respectively) connected via optical fibers 110 and 111. Nodes 101–104 may include network elements capable of adding and dropping channels from the signals transported via optical fibers 110–111, as illustrated at nodes 101 and node 102. The basic principles of operation of a UPSR are well-known to those skilled in the art. For example, UPSR networks are well-known in the SONET/SDH domain, e.g., see Bellcore Generic Requirements, GR-1400-CORE, "*SONET Dual-Fed Unidirectional Path-Switched Ring (UPSR) Equipment Generic Criteria*", January 1999, M. Chow, "*Understanding SONET/SDH Standards and Applications*", pp 7–23 to 7–40 (1995), and W. Goralski, "*SONET: A Guide to Synchronous Optical Networks*", pp. 342–366(1997), all of which are incorporated by reference herein. In general, a UPSR is made survivable by the use of a so-called working path and a protection path, as well as the use of head-end bridging and tail-end switching at the ingress and egress nodes.

Using FIG. 1 as an example, nodes 101–104 are connected via optical fiber 110 in a working path and via optical fiber 111 in a protection path. Signals entering node 101, for example, are head-end bridged onto both optical fibers 110 and 111 and propagate in opposite directions (as shown by the arrows) via the working and protection paths to node 102. At node 102, tail-end switching may be used to select the signals from either the working or protection path for egress at node 102. In this way, the ring is survivable because communications can be maintained between nodes in the event of certain failure conditions in UPSR 100.

In the case of a WDM-based UPSR, a multi-wavelength optical signal comprising many optical channels, with each channel operating at a distinct wavelength, are carried on each of optical fibers 110 and 111. To take advantage of the benefits of optical transmission within a WDM-based UPSR, it is desirable to drop and add individual optical channels from the multi-wavelength signal at selected nodes within the ring. For example, it may be desirable to add traffic via a particular optical channel at node 101 and drop that traffic at node 102. Accordingly, an optical add/drop capability must be provided at each of nodes 101 and 102 to facilitate the adding and dropping of information from that optical channel. Optical add/drop multiplexers are typically used for this purpose.

It should be noted that additional equipment, both optical and electronic, may be required at each of the nodes for appropriate routing of the traffic, e.g., SONET add/drop multiplexers, cross-connects, ATM switches, IP routers, and the like. For purposes of understanding the principles of the invention, the detailed nature of this other electronic and optical equipment used for processing the added and dropped traffic is inconsequential.

Referring again to FIG. 1, wavelength assignment may be an issue in a WDM-based UPSR because of the fact that communications is unidirectional and because signals are bridged onto both the working and protection paths between nodes. For example, signals from node 101 to node 102 and from node 102 to node 101 on optical fiber 110 propagate in the same direction. Similarly, signals between these nodes in optical fiber 111 also propagate in the same direction. As such, if the same wavelength is used for communications from node 101 to node 102 and from node 102 to node 101, then that wavelength will be occupied entirely around the ring on both optical fibers 110 and 111, e.g., the working and protection paths respectively. Consequently, there may be no opportunity for wavelength reuse because of the one-to-one correspondence between each connection and an individual optical channel of a particular wavelength, i.e., a dedicated wavelength. More specifically, a separate optical channel (e.g., at wavelength $\lambda_1$ may be used for communications between nodes 101 and 102, another optical channel (e.g., wavelength $\lambda_2$) may be used for communications between nodes 101 and 103, and so on. As such, wavelength assignment in a WDM-based ring becomes an important consideration, especially in the context of add/drop capability in a WDM-based ring.

Figure 2A:
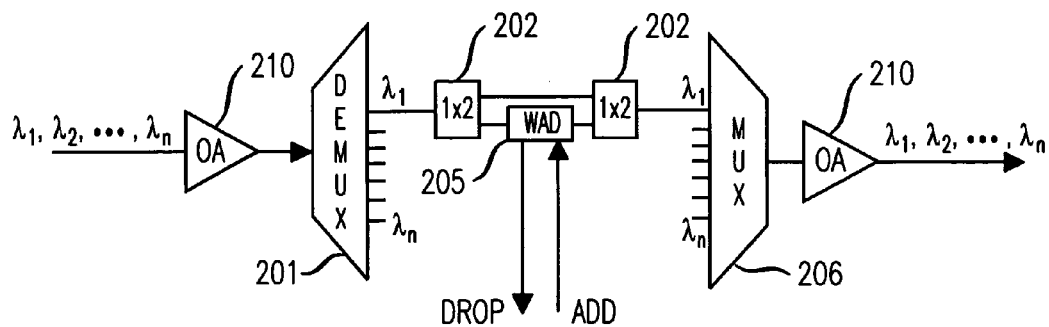
FIGS. 2A and 2B are simplified block diagrams of typical add/drop arrangements for multi-wavelength optical systems.
Figure 2B:
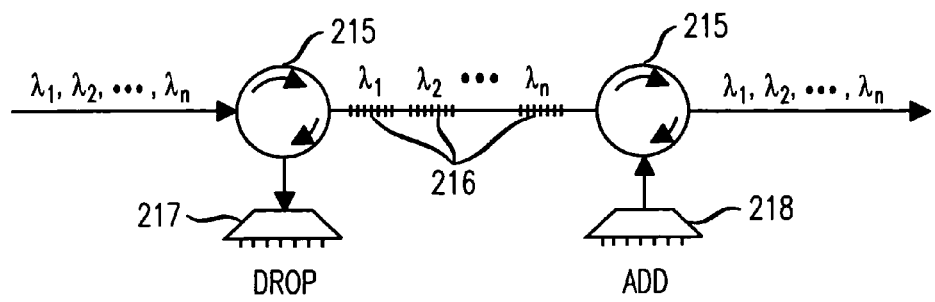

As previously described, the conventional approach to wavelength add/drop multiplexers is to extract the entire signal power for a selected wavelength at an add/drop node. Accordingly, existing add/drop arrangements typically include wavelength-selective components for adding and dropping individual optical channels from the composite multi-wavelength optical signal, that is, the WDM signal. However, these add/drop arrangements have many disadvantages as will be described below. FIGS. 2A and 2B show two examples of wavelength add/drop elements that provide flexible add/drop capability for WDM applications.

The add/drop arrangement shown in FIG. 2A includes an optical demultiplexer 201 for demultiplexing the composite WDM signal into its constituent optical channels. Each optical channel is coupled, in this example, to a series of optical switches 202 and a wavelength add/drop element 205. The wavelength add/drop element can be, for example, a Mach-Zehnder filter which can be used for dropping an individual optical channel and adding an individual optical channel, each associated with the same wavelength. Optical switches 202 are shown to be 1×2 switches which operate in a first position for normal through routing of the optical channel and in a second position for when traffic is to be dropped and/or added to the optical channel. Optical multiplexer 206 is then used to recombine the constituent optical channels into the composite WDM signal. Optical amplifiers 210 are typically provided to compensate for losses that occur in the add/drop arrangement.

Among other problems, these types of add/drop arrangements have high insertion loss and high cost due to the number of components required for a WDM application, especially for systems with high channel counts. As an example, typical losses associated with multiplexer 206 can be as high as 20–24 dB. Another significant disadvantage is the band narrowing effect as a result of the cascading of filters. It should also be noted, although not shown, that a separate transmitter and receiver is required for each channel to be added and dropped, respectively. Removal of optical switches 202, while reducing cost and losses, presents other problems relating to in-service upgrades and the like. In particular, the use of 1×2 switches allow for relatively non-disruptive upgrades to a system, e.g., switches are included at startup while wavelength add/drop devices will vary depending on user requirements and the like.

FIG. 2B shows another example of an optical add/drop arrangement that uses fiber Bragg gratings as the wavelength—selective elements. This arrangement is well-known, see, e.g., Giles et al., "*Low Loss Add/Drop Multiplexers for WDM Lightwave Networks*", Tenth International Conference on Integrated Optics and Optical Fibre Communication, vol. 3, Hong Kong, June 1995, pp. 66–67. In this configuration, optical circulators 215 are used in conjunction with gratings 216 for dropping and adding optical channels via optical demultiplexer 217 and multiplexer 218, respectively. In operation, gratings 216 are transmissive with respect to those optical channels that are to be passed through and reflective with respect to those optical signals being dropped and added. As in the prior arrangement, cost and, to a lesser extent, loss becomes an issue because of the number and complexity of the components. Moreover, band narrowing is still a problem as signals propagate through the successive gratings and service upgrades will likely disrupt existing service.

Figure 3A:
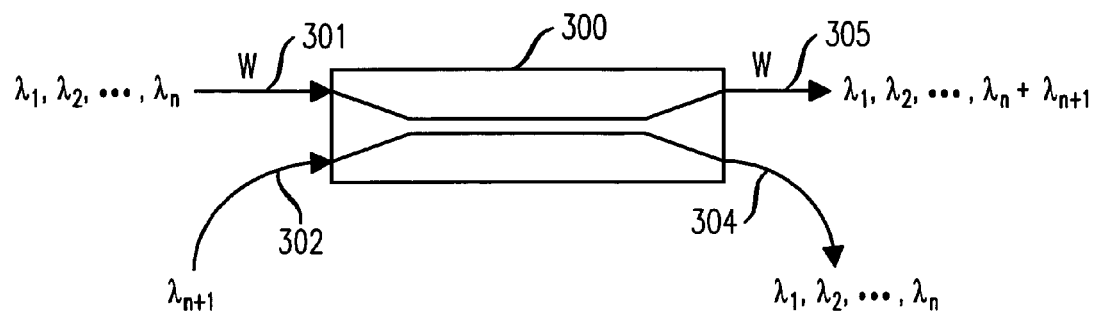
FIGS. 3A and 3B are simplified block diagrams of broadband couplers which can be used in wavelength add/drop elements according to the principles of the invention.
Figure 3B:
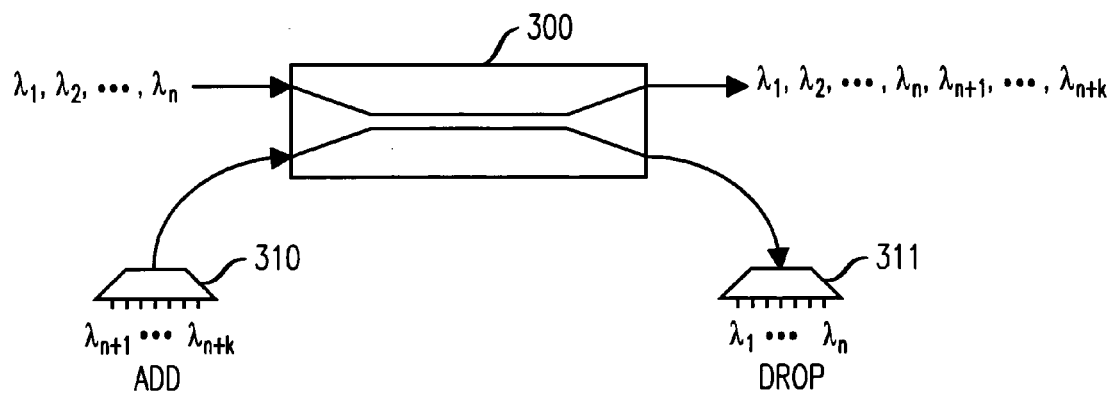

According to the principles of the invention, the state of the art is advanced by adding and dropping optical channels from a WDM signal by using broadband coupler based add/drop elements, coupled with appropriate wavelength assignment and signal routing in the ring network. FIGS. 3A and 3B show two exemplary broadband coupler arrangements that can be used according to the principles of the invention, wherein FIG. 3A would be useful for a single wavelength add/drop scenario and FIG. 3B extends the concept to a multi-wavelength add/drop scenario using appropriate multiplexing/demultiplexing components.

More specifically, FIG. 3A shows a simplified block diagram of the basic building block of the add/drop arrangement according to the principles of the invention. Briefly, a broadband coupler or tap 300 (referred hereinafter as coupler 300) allows optical signals to be extracted and/or added onto a transmission facility, e.g., an optical fiber and the like. Coupler 300 includes input 301 for receiving a multi-wavelength WDM optical signal and input 302 for receiving an optical channel of a particular wavelength to be added to the WDM optical signal. Because coupler 300 is broadband, each output 304 and 305 carries the composite WDM optical signal, i.e., all wavelengths. However, the optical channel to be dropped from the composite WDM optical signal is extracted from the WDM optical signal that is supplied via output 304 while the WDM optical signal, which includes the added optical channel, is supplied via output 305.

Broadband couplers and taps and their operation are well known to those skilled in the art. As such, those skilled in the art will recognize that various broadband optical couplers may be used for practicing the teachings of the present invention. In general, it is contemplated that coupler 300 can be any suitable optical device that distributes, splits, or otherwise couples optical power among two or more ports. In the context of the present invention, coupler 300 is referred to as broadband because it is contemplated that coupler 300 possesses the necessary spectral bandwidth to: 1) receive a WDM signal having a plurality of optical channels of differing wavelengths; 2) tap off a portion of optical signal power of the WDM signal so that particular optical channels from the WDM signal can be dropped at a node; and 3) supply another portion of optical signal power of the WDM signal for output to optical transmission facilities.

In the embodiments shown and described herein, a "20/80" broadband coupler is contemplated for carrying out the principles of the invention. One such example is the dual window broadband coupler manufactured by E-Tek Dynamics, Inc. In this exemplary coupler, approximately 20% of the optical signal power of the optical signals supplied via inputs 301 and 302 is tapped off and supplied via tap output 304 while approximately 80% of the optical signal power is supplied in the outgoing WDM signal via output 305. It should be noted that this example is only meant to be illustrative because other fractional-type coupling and tapping percentages may be used in practicing the teachings of the invention. For example, it is well known that the coupling ratio of coupler 300 may be varied according to design and performance parameters in order to achieve a desired percentage of light transferred to tap output 304 and output 305. In particular, the amount or percentage of optical signal power tapped off from an optical fiber is a matter of design choice, which can be based on such parameters as optical transmitter power, receiver sensitivity, fiber loss, to name a few examples. By way of example in the embodiments shown and described herein, the range of desirable tapped power may be approximately in the range of 0.5 dB to 3 dB, such as 1 dB for example. Again, these values are only meant to be illustrative and will depend on many factors well known to those skilled in the art.

FIG. 3B illustrates how coupler 300 can be used in conjunction with other components, such as optical multiplexer 310 and optical demultiplexer 311, for adding and dropping a plurality of optical channels of different wavelengths to the WDM optical signal. In all other respects, the operation and features of coupler 300 are similar to those already described in FIG. 3A and will not be repeated here for sake of brevity.

Figure 4:
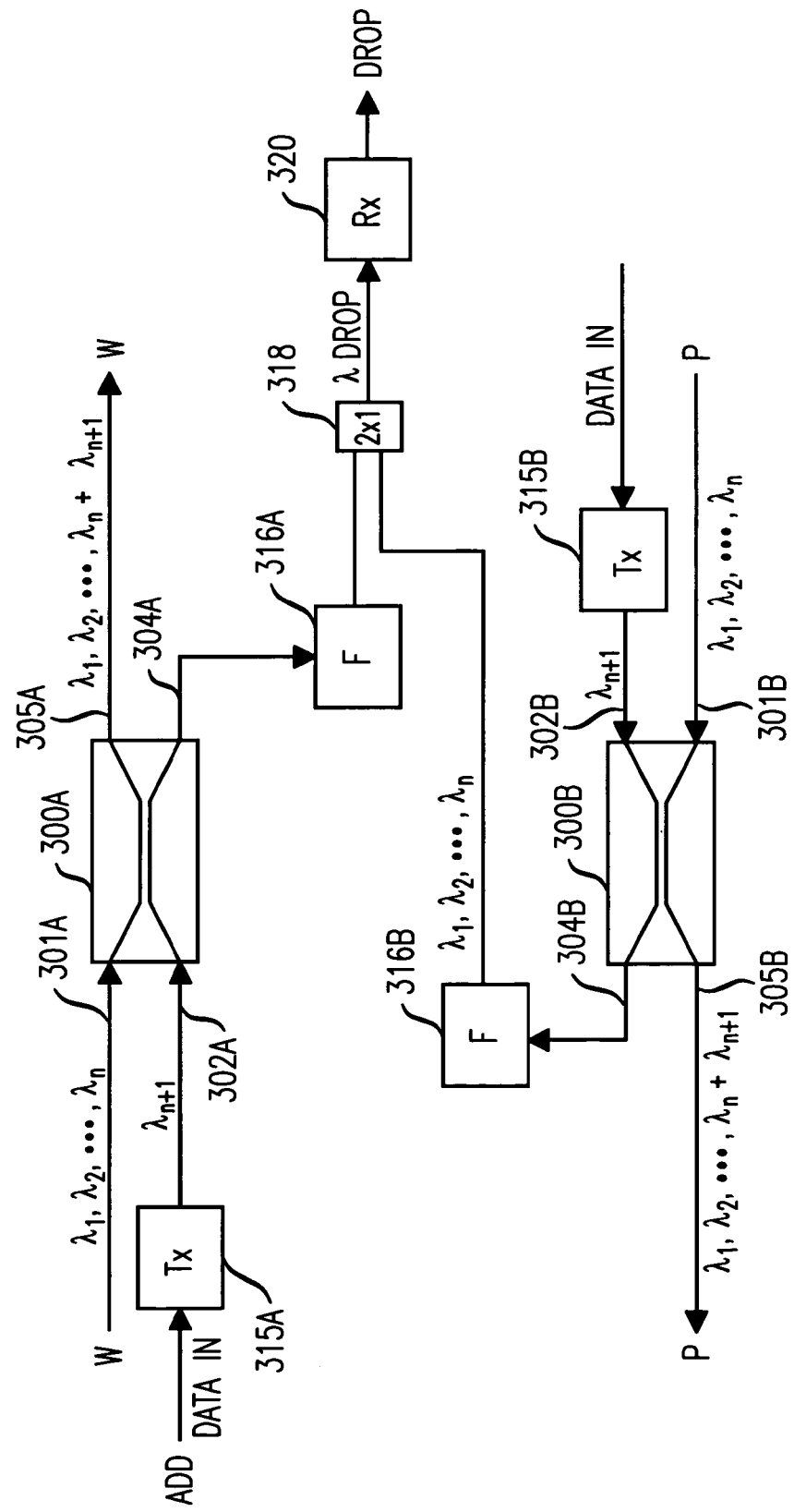
FIG. 4 shows an exemplary embodiment of an add/drop arrangement using the broadband coupler of FIG. 3 in a uni-directional path-switched ring (UPSR) network.

Referring again to UPSR 100 in FIG. 1, it is contemplated that one or more nodes 101–104 would include an add/drop arrangement using couplers 300 (FIGS. 3A and 3B) according to the principles of the invention. More specifically, FIG. 4 shows one exemplary embodiment of an add/drop arrangement according to the principles of the invention employing couplers 300A and 300B for use in UPSR 100. As shown, the add/drop arrangement includes coupler 300A which is coupled to optical fiber 110, i.e., the working path of UPSR 100 from FIG. 1. Similarly, coupler 300B is coupled to optical fiber 111, i.e., the protection path of UPSR 100. Both coupler 300A and 300B receive, at inputs 301A and 301B respectively, the WDM signal comprising a plurality of optical channels of different wavelengths, represented here as $\lambda_1, \lambda_2, \ldots \lambda_n$. As previously described, the same signal is typically head-end bridged onto both the working and protection paths of a UPSR.

Couplers 300A and 300B are further coupled to optical transmitters 315A and 315B at inputs 302A and 302B, respectively, wherein each optical transmitter supplies an optical channel of a particular wavelength, designated here as $\lambda_{n+1}$ to be added to the WDM signal. It is contemplated that optical transmitters 315A and 315B may be of the fixed or tunable type, wavelength-selective, directly or externally modulated, and the like. Specific examples of different devices used for supplying an optical carrier (i.e., optical channel of a particular wavelength) and for modulating data onto the optical carrier are well known to those skilled in the art. Consequently, for simplicity of explanation and illustration, the components for adding traffic (e.g., data) to the WDM signal will be represented collectively as optical transmitters. According to another aspect of the invention, which will be described in more detail below in the context of specific network configuration examples, optical transmitters 315A and 315B may either be separate devices as shown in FIG. 4 or may be implemented as a single optical transmitter. In the latter case, an optical transmitter can be coupled to a splitter device (not shown), e.g., 1×2 power splitter, for supplying an optical channel (i.e., having the same wavelength) to each of couplers 300A and 300B. Other modifications will also be apparent to those skilled in the art.

Couplers 300A and 300B are further coupled to optical filters 316A and 316B at outputs 304A and 304B, respectively. As previously described, couplers 300A and 300B are broadband couplers so that only a portion of the optical signal power of the composite WDM optical signal (i.e., $\lambda_1, \lambda_2, \ldots \lambda_n$) is tapped at the couplers. As such, optical filters 316A and 316B are needed for filtering out the optical channel of a particular wavelength to be dropped from the WDM optical signal, designated here as $\lambda_{drop}$, where $\lambda_{drop}$ represents one or more of the constituent optical channels (i.e., $\lambda_1, \lambda_2, \ldots \lambda_n$) Optical filters, as well as other components for separating or splitting the composite WDM optical signal into constituent optical channels, are well known to those skilled in the art.

The filtered optical channel from each of the working and protection paths, i.e., the constituent optical channel to be dropped from the WDM optical signal, is then supplied to an optical protection switching element 318. By way of example, switching element 318 provides the tail-end switching function in UPSR 100 for selecting the signal supplied by either the working or protection path according to the particular protection switching arrangement being used. The selected optical channel is then supplied to appropriate optical receiver 320 for appropriate processing at the drop node. Specific examples of different devices used for receiving and processing a modulated optical carrier (i.e., optical channel of a particular wavelength) are well known to those skilled in the art. Consequently, for simplicity of explanation and illustration, the components for dropping traffic (e.g., data) from the WDM signal will be represented collectively as optical receivers.

Furthermore, because couplers 300A and 300B are broadband, a portion of the optical signal power of the composite WDM optical signal (i.e., $\lambda_1, \lambda_2, \ldots \lambda_n$), including the added optical channel (e.g., $\lambda_{n+1}$), is supplied via outputs 305A and 305B on optical fiber 110 and 111 on the working and protection paths respectively. In this way, broadband couplers 300A and 300B also facilitate a drop and continue operation.

It should be noted that modifications to the above embodiment can also be made to accommodate electronic protection switching. For example, opto-electronic receivers can be used in place of optical filters 316A and 316B followed by an electronic switch, e.g., 2×1 switch, for carrying out the tail-end switching function of switch 318.

Using broadband couplers to add and drop signals could give rise to a potential crosstalk problem. More specifically, because signals are both launched (i.e., added) and extracted (i.e., dropped) through the same tap or coupler, there is a potential for the launched signal to "leak" into the extracted signal. This unwanted effect may be further exacerbated by the fact that the launched signal will typically have higher optical signal power than the extracted or tapped signal. By way of example, this potential for leakage could be the result of the channel isolation and crosstalk characteristics of the particular optical filters, demultiplexers, and the like, which are being used to filter out the optical channel of a particular wavelength that is to be dropped from the WDM signal. Accordingly, FIG. 5 shows an exemplary embodiment according to the principles of the invention for substantially reducing or eliminating this unwanted effect using adaptive equalization or cancellation.

Figure 5:
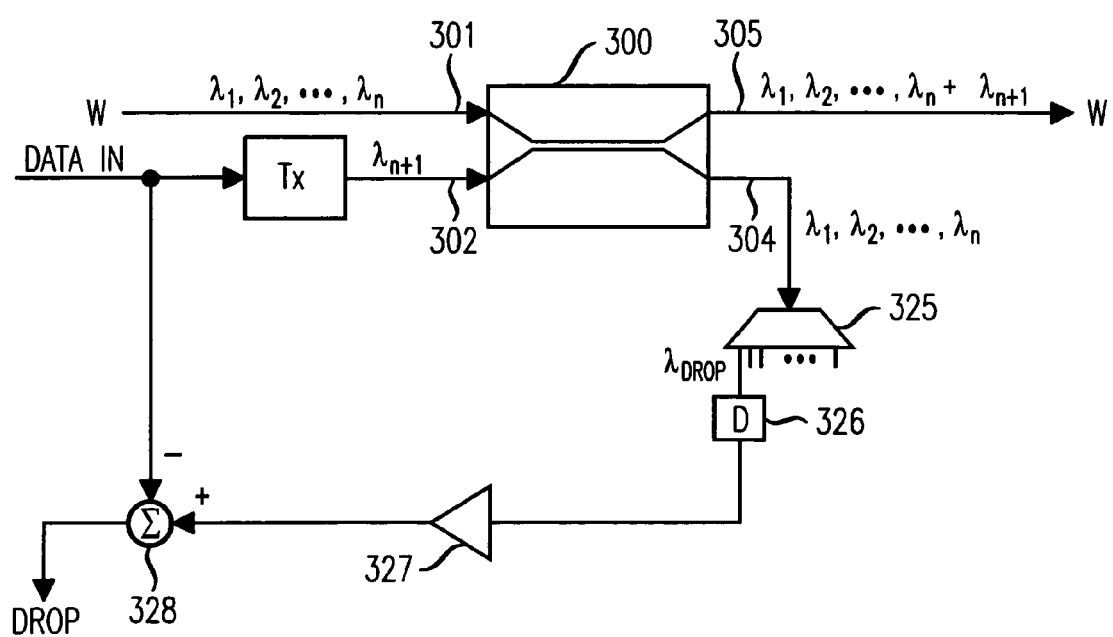
FIG. 5 shows another exemplary embodiment of an add/drop arrangement according to the principles of the invention.

More specifically, FIG. 5 shows coupler 300 having similar features already described in the previous embodiments. For sake of brevity, only the differences between this embodiment and the previously disclosed embodiments will be described herein. As shown, coupler 300 is coupled to optical demultiplexer 325 via output 304. Demultiplexer 325 receives the portion of the composite WDM signal that is tapped by coupler 300 and separates the composite WDM signal into the individual optical channels of different wavelengths. Because of the aforementioned crosstalk and channel isolation limitations of devices, such as optical demultiplexers, it is possible that the tapped WDM optical signal may include unwanted signal components from the optical channel being added at the input of coupler 300, i.e., shown here as $\lambda_{n+1}$. Consequently, the individual optical channel to be dropped at the node, shown here as $\lambda_{drop}$, may also include these unwanted signal components.

To remedy this problem, the individual optical channel to be dropped at a node ($\lambda_{drop}$) is coupled to a device such as photodetector 326 for conversion to an electrical signal. The operation of photodetectors and equivalent devices are well known to those skilled in the art. The electrical signal can then be further coupled to an amplifier 327 in a conventional manner. The amplified electrical signal is then supplied to a subtraction circuit 328 so that the signal added at the node (i.e., at input 302 of coupler 300) can be subtracted from the signal being dropped at the node. Other techniques for removing the unwanted signal components from the tapped signal will be apparent to those skilled in the art and are contemplated by the teachings herein.

To gain a better understanding of the principles of the invention, several exemplary ring network configurations will now be described which employ the broadband coupler-based add/drop arrangements described in the foregoing embodiments.

EXAMPLE 1

Unidirectional Path-Switched Ring

FIGS. 6A–6D show an exemplary unidirectional path-switched ring (UPSR) 400 in which the principles of the invention may be employed. As shown, UPSR 400 includes nodes 401–403 and a special function node 405, referred hereinafter as termination node 405 for reasons that will be described in more detail below. Nodes 401–403 and termination node 405 are interconnected in a ring configuration via optical fibers 410 and 411, referred hereinafter as working path 410 and protection path 411, respectively. The basic principles of operation of a UPSR are well-known and were briefly summarized in the description accompanying FIG. 1. Nodes 401–403 may each include the broadband coupler-based add/drop arrangement described in the foregoing embodiments (e.g., FIGS. 3 and 4). However, the exemplary scenarios shown in FIGS. 6A–6D illustrate a specific example of communications between nodes 402 and 403 (i.e., nodes B and C). As such, it is assumed that at least nodes 402 and 403 each include the broadband coupler-based add/drop arrangement shown in FIG. 4.

Additionally, termination node 405 is required in this embodiment because of optical self-interference problems that may arise in closed ring architectures. As is well known, these problems can arise when an optical channel of a particular wavelength, which is used for carrying traffic between two nodes, also continues to propagate around the ring indefinitely. In general, no circulating (i.e., re-circulation) is allowed in a ring in order to avoid the self-interference problems. According to the principles of the invention, self-interference effects can be substantially reduced at the termination node by converting incoming optical signals to electrical signals and then back to optical signals. More specifically, termination node 405 is employed in the ring to serve as the originating and terminating point of the ring, where some signals may be added at the node, some signals may be dropped at the node, some signals are expressed through the node (e.g., normal through), and some signals may be terminated or otherwise suppressed at the node. By way of example only, the termination node function may be carried out at a central node (e.g., central office location) or at a common cross-connect node which interfaces several rings. It should also be noted that termination node 405 may also be used for monitoring the network and for sending control and administrative information to the other nodes in the ring.

Figure 8:
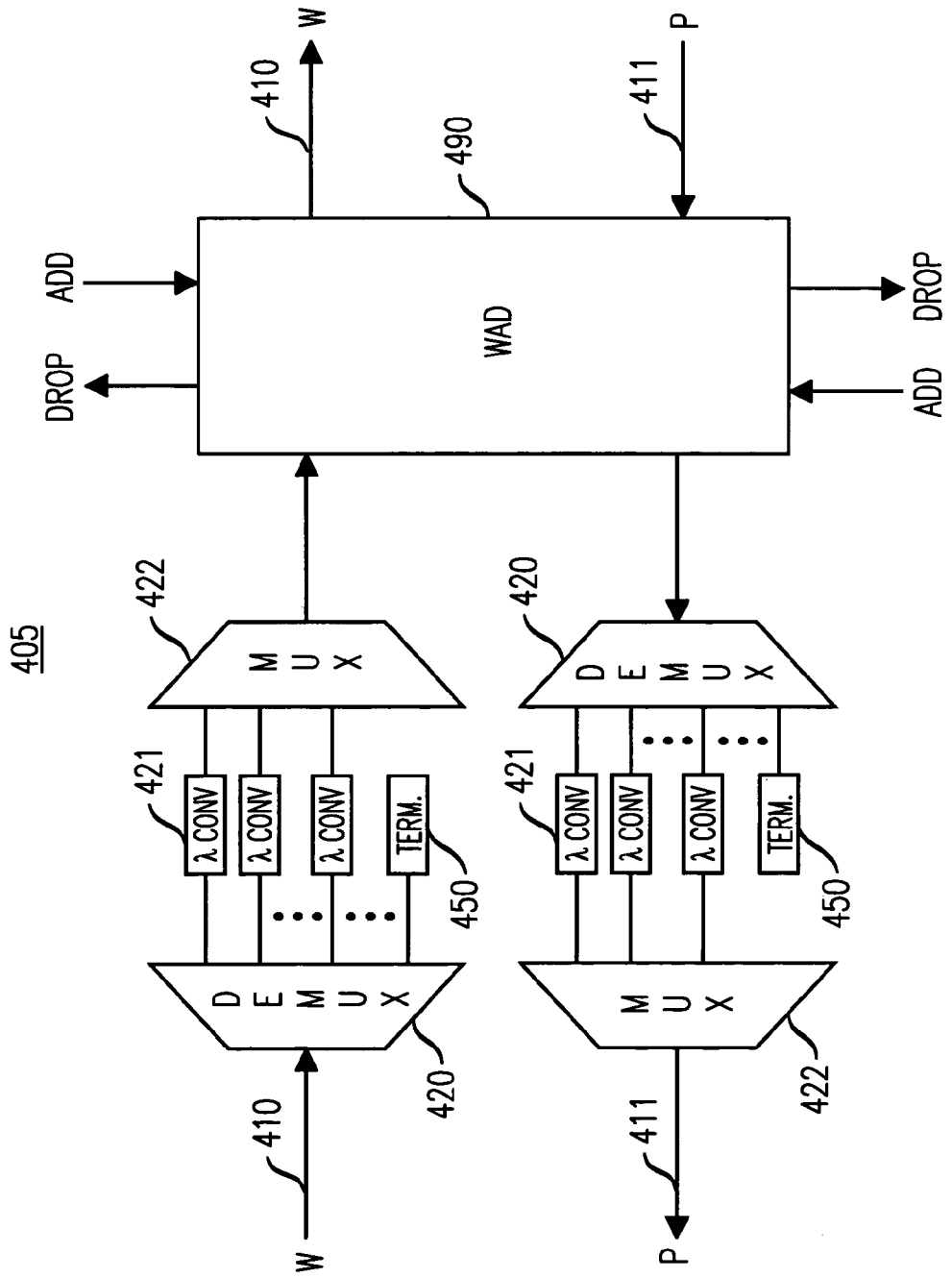
FIG. 8 is a simplified block diagram of one of the nodes from the network shown in FIGS. 6A–6D and 7A–7D according to the principles of the invention.

FIG. 8 shows a simplified block diagram of an exemplary embodiment of the termination node according to the principles of the invention. Briefly, termination node includes components for demultiplexing and multiplexing WDM optical signals, components for converting wavelengths of individual optical channels, and components for adding and dropping signals. Termination node 405 in FIG. 8 can be used in UPSR 400 of FIG. 6, wherein termination node is coupled to working path 410 and protection path 411 of the ring. In termination node 405, optical demultiplexer 420 is coupled to working path 410 for separating the WDM optical signal into individual optical channels. Some of the optical channels are coupled to wavelength converters 421. Wavelength converters, e.g., optical translator units (OTUs), are well known to those skilled in the art. Using OTUs as an example, an optical signal is converted to an electrical signal and then converted back to an optical signal of a different wavelength. The need for wavelength converters will be described in more detail below in the context of UPSR operation in FIG. 6. Some of the demultiplexed optical channels are terminated or otherwise suppressed at termination element 450. Many different methods and devices for terminating optical signals will be apparent to those skilled in the art, e.g., photodetectors and receivers and the like.

After appropriate wavelength conversion or termination, the individual optical channels are then multiplexed by optical multiplexer 422 into a composite WDM optical signal. Although complete demultiplexing of all channels and subsequent multiplexing is envisioned at termination node 405, there are several methods and wavelength plans that may be implemented to achieve this functionality. One example is an arrayed waveguide router multiplexer/demultiplexer, such as the so-called Dragone router, see, e.g., U.S. Pat. No. 5,002,350, which is incorporated by reference herein. However, other solutions will be apparent to those skilled in the art and are contemplated by the teachings herein.

Coupled to protection path 411 are optical demultiplexer 420, multiplexer 422, wavelength converters 421, and termination element 450, all of which carry out the same function as previously described for the corresponding components in working path 410. As shown, wavelength add/drop element 490 is coupled to each of working and protection paths 410 and 411, respectively for adding and dropping optical channels as appropriate. For simplicity of illustration, wavelength add/drop element 490 is represented as a single functional block, however, it will be appreciated that wavelength add/drop element 490 can be implemented using the broadband coupler-based add/drop arrangement shown in FIG. 4.

In operation, signals can be added and dropped in UPSR 400 as shown in FIG. 6. Although a composite WDM signal comprising optical channels of different wavelengths is propagating around UPSR 400, only the optical channels actually being added and dropped at the selected nodes are shown by the dotted arrows in the ring for simplicity of illustration. FIGS. 6A and 6B show communications from node B (402) to node C (403). Node B sends data on optical channel $\lambda_1$ in the clockwise direction on working path 410 (FIG. 6A) and counterclockwise on protection path 411 (FIG. 6B). In FIG. 6A, node C, using a broadband coupler-based add/drop arrangement such as that shown in FIG. 4, taps off some of the optical signal power of the WDM optical signal from working path 410 so that traffic carried on optical channel $\lambda_1$ can be dropped at node C. The remainder of the optical signal power in optical channel $\lambda_1$ of the WDM signal in working path 410 is then terminated by termination element 450 at termination node 405. One reason for terminating or otherwise suppressing optical channel $\lambda_1$ after it has passed its destination node (node C) is to prevent interference that would otherwise occur if the optical channel was allowed to circulate around to node B where it was added to the ring.

Figure 6A:
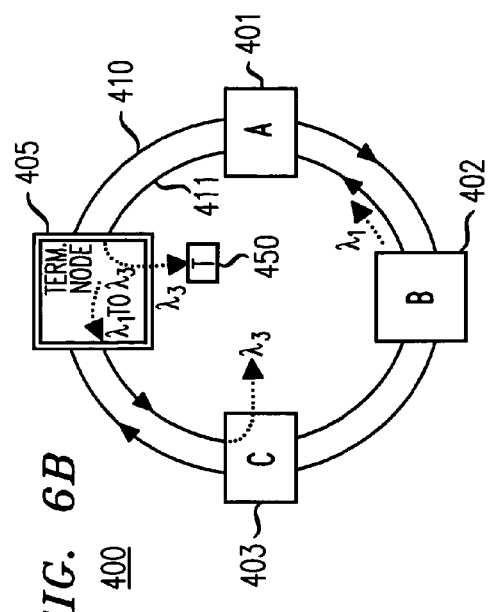
Figure 6B:
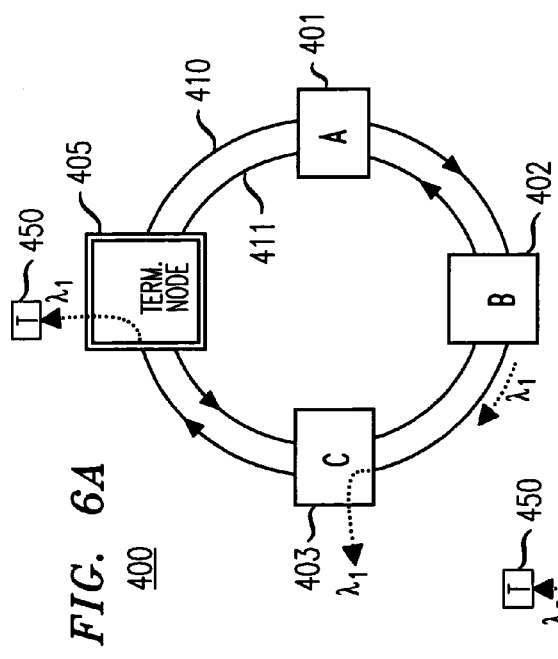

As shown in FIG. 6B, the WDM signal (including optical channel $\lambda_1$) propagates counterclockwise along protection path 411. Upon being received in termination node 405, the wavelength of optical channel $\lambda_1$ is converted to optical channel $\lambda_3$. One reason for converting the wavelength of an optical channel that has not yet passed its destination node is to also avoid interference that would otherwise occur if the optical channel of the original wavelength, e.g., optical channel $\lambda_1$, was allowed to circulate around back to node B where it was originally added to the ring. As shown, node C taps off some of the optical signal power of the WDM optical signal from protection path 411 so that traffic carried on optical channel $\lambda_3$ can be dropped at node C. The remainder of the optical signal power in optical channel $\lambda_3$ of the WDM signal in protection path 411 is then terminated by termination element 450 at termination node 405.

The wavelength assignments in UPSR 400 and use of termination node 405 in FIGS. 6A and 6B illustrate an important aspect relating to wavelength reuse. In particular, because a broadband coupler only taps off a portion of the optical signal power of the WDM optical signal (i.e., all wavelengths) as opposed to extracting particular wavelengths of the WDM optical signal at a particular node, the WDM optical signal (i.e., all wavelengths) still propagates around the ring. As such, individual wavelengths for the optical channels being added and dropped between nodes on the ring cannot be reused. For example, a wavelength being used for the optical channel carrying traffic from node 402 to node 403 (added at B and dropped at C) cannot also be used for the optical channel carrying traffic from node 403 to 402 (added at C and dropped at B). Accordingly, an add/drop arrangement according to the principles of the invention requires different wavelengths to support each of the connections in the ring, e.g., $\lambda_1$ for B to C, $\lambda_2$ for C to B, and so on.

Figure 6D:
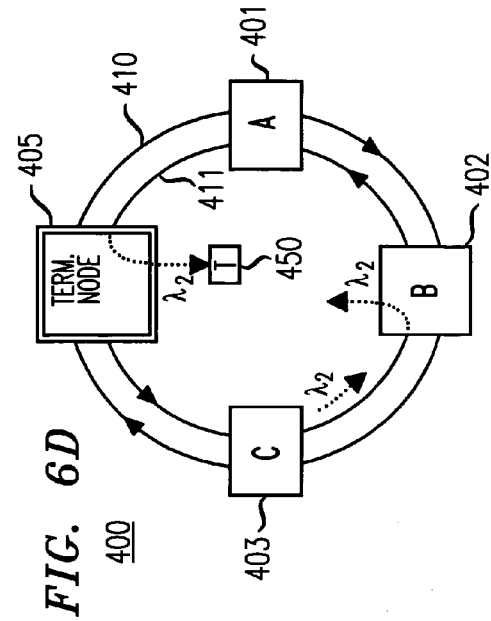
Figure 6C:
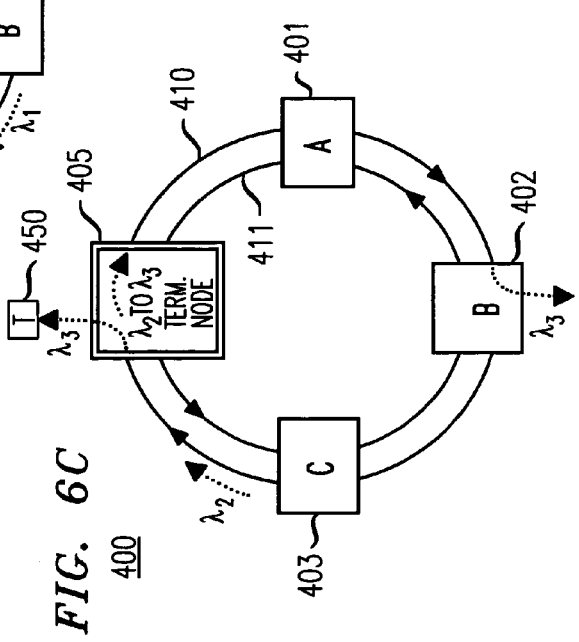

Similarly, FIGS. 6C and 6D illustrate communications from node C to node B. Node C sends data on optical channel $\lambda_2$ in the clockwise direction on working path 410 (FIG. 6C) and counterclockwise on protection path 411 (FIG. 6D). As shown in FIG. 6C, termination node 405 converts the wavelength of optical channel $\lambda_2$ to optical channel $\lambda_3$ for reasons previously described. As shown, node B taps off some of the optical signal power of the WDM optical signal from working path 410 so that traffic carried on optical channel $\lambda_3$ can be dropped at node B. The remainder of the optical signal power in optical channel $\lambda_3$ of the WDM optical signal in working path 410 is then terminated in working path 410 by termination element 450 at termination node 405. As shown in FIG. 6D, node B taps off some of the optical signal power of the WDM optical signal from protection path 411 so that traffic carried on optical channel $\lambda_2$ can be dropped at node B. The remainder of the optical signal power in optical channel $\lambda_2$ of the WDM optical signal in protection path 411 is then terminated by termination element 450 at termination node 405.

In the preceding embodiment shown in FIG. 6, a given node adds an optical channel of the same wavelength on both the working and protection paths but receives and drops optical channels of different wavelengths from the working and protection paths. In another alternative embodiment, it may be desirable for a node to add optical channels of different wavelengths onto the working and protection paths, but receive and drop optical channels having the same wavelength. This latter example is illustrated in FIGS. 7A–7D. Because the same principles of operation described for FIGS. 6A–6D apply equally to the embodiment shown in FIGS. 7A–7D, the same will not be described again for sake of brevity. Other modifications which are within the spirit and scope of the present invention will be apparent to those skilled in the art and are contemplated by the teachings herein.

EXAMPLE 2

Unidirectional Line-Switched Ring

The add/drop arrangement according to the principles of the invention may also be advantageously employed in a second type of ring network, the so-called unidirectional line-switched ring (ULSR) network. Again, the basic principles of operation of a ULSR network are well-known. Briefly, nodes in a ULSR communicate by routing signals in the same direction, i.e., unidirectionally, on the working path only. In the event of a node failure, cable cut, or other fault condition, nodes adjacent to the failure location implement so-called "loop back switching" in which signals are routed via the protection path in the direction opposite to that in the working path.

Figure 9B:
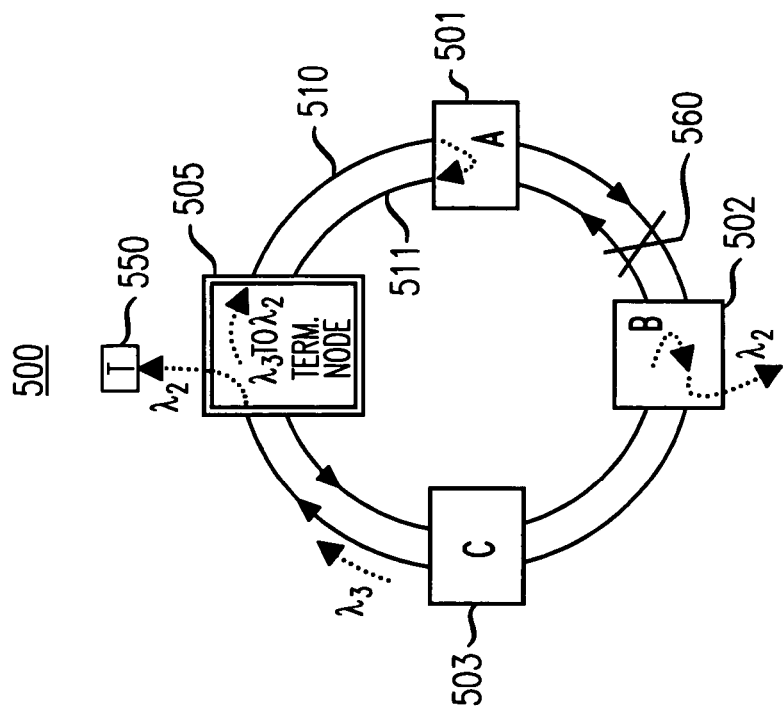
FIGS. 9A and 9B are simplified network diagrams illustrating the principles of the invention in the context of communications in a uni-directional line-switched ring (ULSR) network.
Figure 9A:
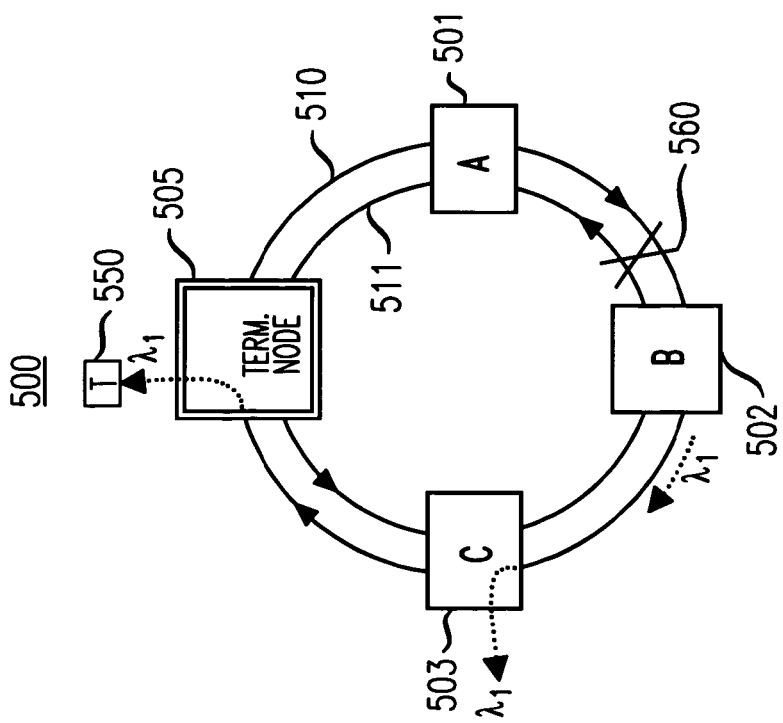

According to the principles of the invention, WDM signals may be added and dropped in a ULSR using a broadband coupler-based add/drop arrangement. More specifically, FIGS. 9A–9B show an exemplary unidirectional line-switched ring (ULSR) 500 in which the principles of the invention may be employed. As shown, ULSR 500 includes nodes 501–503 and termination node 505. Nodes 501–503 and termination node 505 are interconnected in a ring configuration via optical fibers 510 and 511, referred hereinafter as working path 510 and protection path 511, respectively. As in the preceding UPSR example, nodes 501–503 may each include a broadband coupler-based add/drop arrangement. However, the exemplary scenarios shown in FIGS. 9A–9B illustrate a specific example of communications between nodes 502 and 503 (i.e., nodes B and C) in the event of a failure between nodes 501 and 502 (i.e., nodes A and B). As such, it is assumed that at least nodes 502 and 503 each include a broadband coupler-based add/drop arrangement.

Again, for simplicity of illustration, only the optical channels actually being added and dropped at the selected nodes are shown by the dotted arrows in the ring even though the composite WDM signal comprising optical channels of different wavelengths is propagating around the ring. In FIG. 9A, node B sends data to node C in the clockwise direction via optical channel $\lambda_1$ on working path 510. Node C, using a broadband coupler-based add/drop arrangement according to the principles of the invention (not shown), taps off some of the optical signal power of the WDM optical signal from working path 510 so that traffic carried on optical channel $\lambda_1$ can be dropped at node C. The remaining optical signal power in optical channel $\lambda_1$ of the WDM optical signal in working path 510 is then terminated by termination element 550 at termination node 505.

As shown in FIG. 9B, node C sends data to node B in the clockwise direction via optical channel $\lambda_3$ on working path 510. For similar reasons already described in the preceding embodiments, termination node 505 converts the wavelength of optical channel $\lambda_3$ to optical channel $\lambda_2$. Because of fault condition 560 between nodes A and B, each of nodes A and B implement loop back switching according to well known techniques for line-switched rings. As such, the WDM optical signal is received at node A in working path 510 and looped back onto protection path 511 where it will continue to propagate towards its destination, e.g., node. At its destination node B, the WDM optical signal is again looped back to working path 510. Node B, using a broadband coupler-based add/drop arrangement according to the principles of the invention (not shown), taps off some of the optical signal power of the WDM optical signal from working path 510 so that traffic carried on optical channel $\lambda_2$ can be dropped at node B. The remaining optical signal power in optical channel $\lambda_2$ of the WDM optical signal propagates in working path 510 to termination node 505 where it is terminated by termination element 550.

It should be noted that, in many scenarios, traffic in the network may not be survivable if the termination node fails. For example, if the termination node failed thereby causing adjacent nodes to implement loop back switching so that signals would not propagate through termination node 505, then appropriate wavelength conversion and suppression/termination would not occur. As a result, the aforementioned interference problems could arise.

Figure 10:
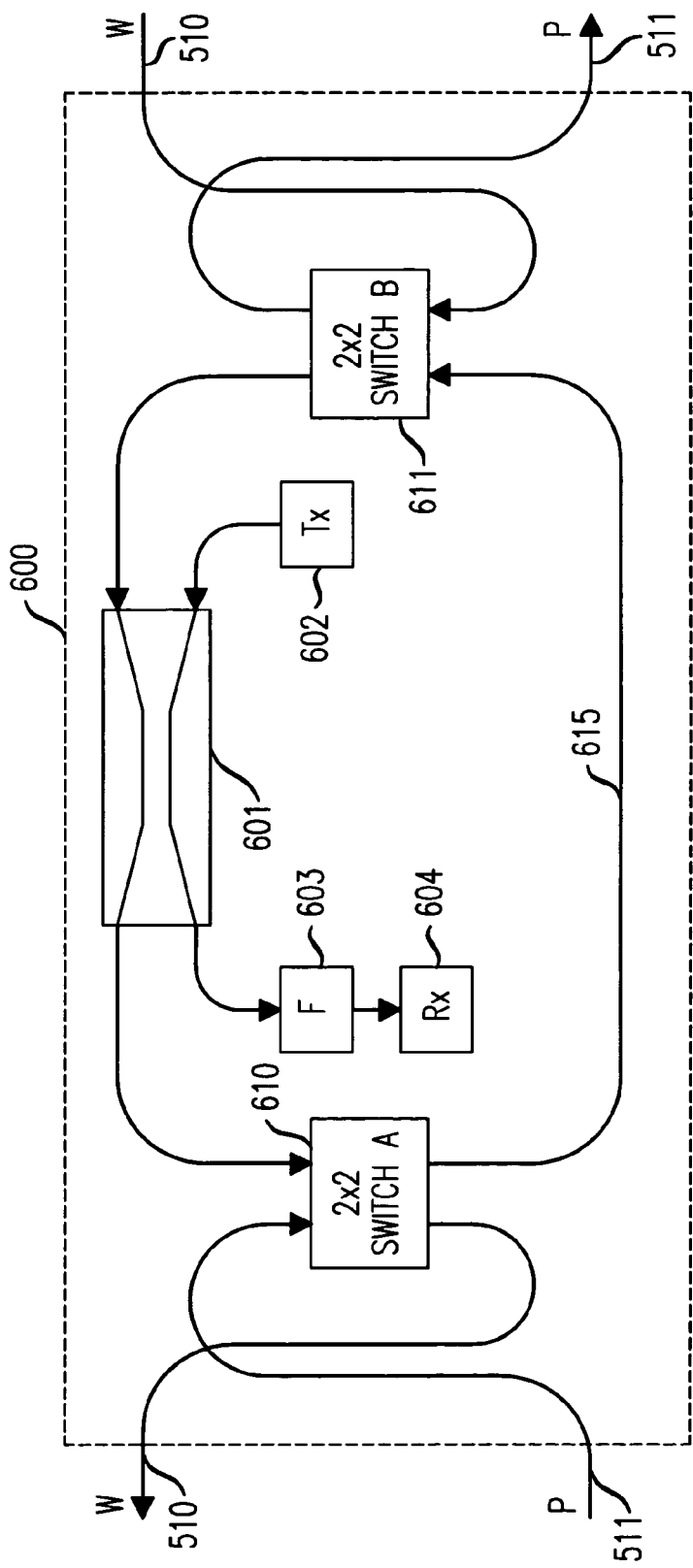
FIG. 10 shows an exemplary embodiment of an add/drop arrangement using the broadband coupler of FIG. 3 in the ULSR network of FIG. 9.

FIG. 10 shows one exemplary embodiment of a broadband coupler-based add/drop arrangement that could be used for adding and dropping signals in ULSR 500 (FIG. 9). It will be apparent to those skilled in the art that the arrangement in FIG. 10 is a variation of the embodiment shown and described in FIG. 4 for the UPSR example. As such, common elements and functions will not be repeated here for sake of brevity. Instead, only the significant differences will be explained, most of which relate to the coupling of the add/drop arrangement to working and protection paths 510–511 as well as the switching and routing of signals from these paths through broadband coupler 601.

As shown, add/drop arrangement 600 includes broadband coupler 601, optical transmitter 602, optical filter 603, and optical receiver 604, each of which operates in a similar manner as described for the arrangement in FIG. 4. However, add/drop arrangement 600 further includes at least two optical switches 610 and 611, which are shown here to be 2×2 optical switches. Optical switches 610 and 611 can be implemented using well known devices such as, for example, opto-electrical switches, mechanical optical switches, lithium niobate switches, polymer-based switches, and the like. Other suitable devices for routing optical signals according to the principles of the invention will be apparent to those skilled in the art.

In normal operation, e.g., no fault conditions, switches 610 and 611 are in a cross-bar state. More specifically, signals entering switch 611 via working path 510 are switched or otherwise routed to coupler 601. At coupler 601, adding and dropping of optical channels occurs as previously described for the embodiment shown in FIG. 4. The WDM optical signal exiting coupler 601 propagates to switch 610 where it is switched or otherwise routed via working path 510.

When there is a failure in the ring (e.g., failure 560 in ULSR 500 of FIG. 9), a node adjacent to that failure (e.g., node A or B) would implement loop back switching and route signals accordingly. In one example, switch 611 (switch B) could change to the so-called bar state and switch 610 (switch A) could remain in the cross-bar state. In this scenario, signals entering switch 611 (switch B) via working path 510 would be loop back switched by switch 611 directly onto protection path 511. Signals received by switch 610 (switch A) via protection path 511 would be switched along path 615 since switch 610 (switch A) is in a cross-bar state. Because switch 611 (switch B) is in a bar state, signals from protection path 511 would then be routed through coupler 601 where appropriate add/drop operations could occur as previously described. Signals exiting coupler 601 would then be routed by switch 610 (switch A), which is still in a cross-bar state, to working path 510. It should be noted that change in states, e.g., cross-bar state or bar state, for each of the optical switches in the add/drop arrangement would depend on location of the fault relative to the node.

EXAMPLE 3

2-Fiber Bi-directional Line-Switched Ring

The add/drop arrangement according to the principles of the invention may also be advantageously employed in another type of ring network, the so-called bi-directional line-switched ring (BLSR) network. As with UPSR and ULSR networks, BLSR networks are well-known in the SONET/SDH domain, e.g., see Bellcore Generic Requirements, GR-1230-CORE, "*SONET Bi-directional Line-Switched Ring Equipment Generic Criteria*", December 1996, M. Chow, "*Understanding SONET/SDH Standards and Applications*", pp 7–23 to 7–40 (1995), and W. Goralski, "*SONET: A Guide to Synchronous Optical Networks*", pp. 342–366(1997), all of which are incorporated by reference herein.

Figure 11:
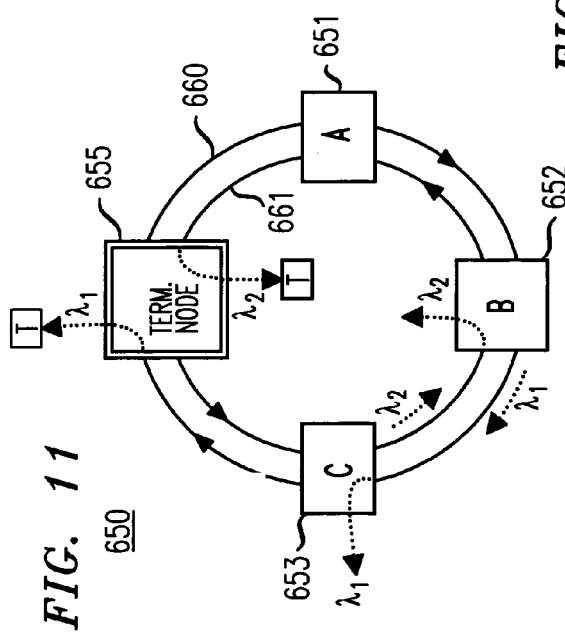
FIGS. 11 and 12A–12B are simplified network diagrams illustrating the principles of the invention in the context of communications in a 2-fiber bi-directional line-switched ring (2F-BLSR) network.

According to the principles of the invention, WDM signals may be added and dropped in a BLSR using a broadband coupler-based add/drop arrangement at one of more of the nodes in the BLSR. More specifically, FIG. 11 shows an exemplary 2-fiber bi-directional line-switched ring (2F-BLSR) 650 in which the principles of the invention may be employed. 2F-BLSR 650 has the same basic physical configuration as the preceding ring networks. In particular, nodes 651–653 and termination node 655 are interconnected in a ring configuration via optical fibers 660 and 661. However, the difference with the 2F-BLSR network as compared with the unidirectional rings occurs in the traffic flow. In a 2F-BLSR network, for example, the bandwidth in each optical fiber 660 and 661 is divided so that one-half is dedicated for working traffic and one-half to protection traffic. Furthermore, traffic flows clockwise in optical fiber 660 and counter-clockwise in optical fiber 661.

Again, for simplicity of illustration, only the optical channels actually being added and dropped at the selected nodes are shown by the dotted arrows in the ring even though the composite WDM signal propagates around the ring. In FIG. 11 (normal operation), node 652 (node B) sends data in the clockwise direction to node 653 (node C) via optical channel $\lambda_1$ using the working bandwidth of optical fiber 660. Similarly, node 653 (node C) sends data in the counter-clockwise direction to node 652 (node B) via optical channel $\lambda_2$ using the working bandwidth of optical fiber 661. As in the preceding embodiments, broadband coupler-based add/drop arrangements (not shown) are included in each of nodes 652 and 653 to facilitate the adding and dropping of optical channels $\lambda_1$ and $\lambda_2$. Optical signals $\lambda_1$ and $\lambda_2$ are terminated in termination node 655 in a similar manner and for similar reasons as previously set forth.

Figure 12B:
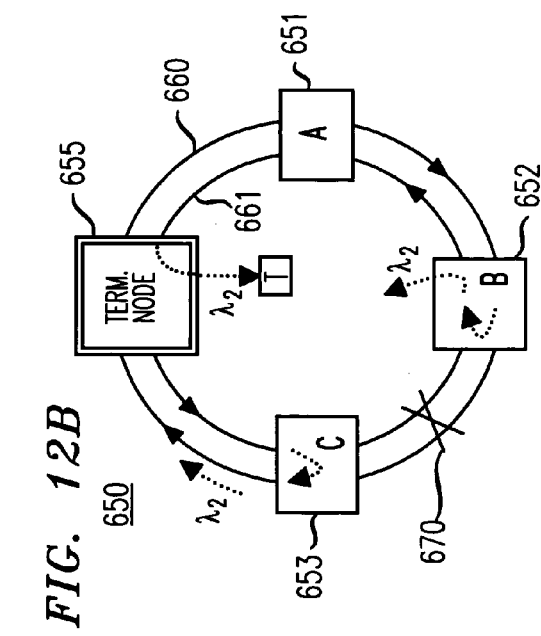
Figure 12A:
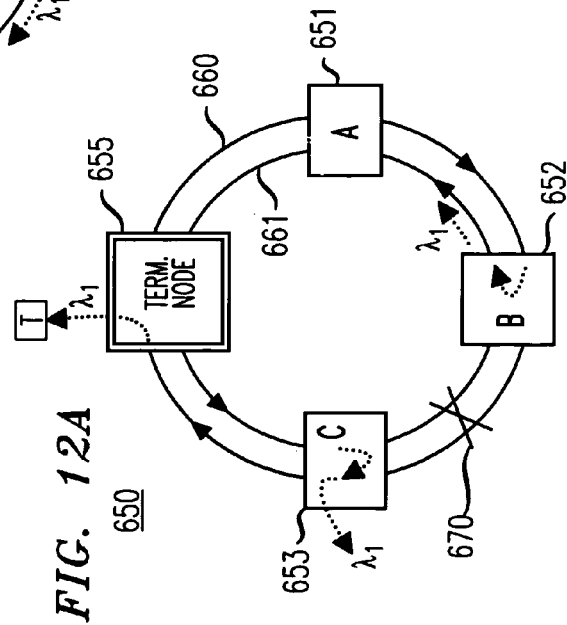

FIGS. 12A and 12B illustrate the operation of 2F-BLSR 650 in the event of failure 670 between nodes B and C, with FIG. 12A showing communications from node B to node C and FIG. 12B showing communications from node C to node B. In general, loop back switching is used in a similar manner as previously described for the ULSR example except for the flow of traffic between the working and protection bandwidths in each of optical fibers 660 and 661. In particular, both nodes B and C implement loop back switching in response to failure 670.

In FIG. 12A, node B, which is in the loop back switch mode, routes the WDM optical signal (including optical channel $\lambda_1$) from the working bandwidth of optical fiber 660 onto the protection bandwidth of optical fiber 661. Optical channel $\lambda_1$ is not terminated at termination node 655 since it has not yet reached its destination. Node C loop back switches the WDM optical signal from the protection bandwidth of optical fiber 661 back onto the working bandwidth of optical fiber 660. Using the broadband coupler-based arrangement according to the principles of the invention (not shown), traffic carried in optical channel $\lambda_1$ is then dropped at node C. The remaining optical signal power in optical channel $\lambda_1$ of the WDM optical signal in the working bandwidth of optical fiber 660 is then terminated at termination node 655 in a similar manner as previously described.

In FIG. 12B, optical channel $\lambda_2$ is routed around 2F-BLSR 650 from node C to node B in a similar manner as described above. The significant difference is that the WDM optical signal (including optical channel $\lambda_2$) is loop back switched at node C from the working bandwidth of optical fiber 661 (counter-clockwise) onto the protection bandwidth of optical fiber 660 (clockwise) and visa versa at node B.

Another significant difference in 2F-BLSR 650 is that termination node 655 still must be capable of passing or terminating optical channels of particular wavelengths in both optical fiber 660 (clockwise) and optical fiber 661 (counter-clockwise). However, wavelength conversion is not necessarily required, which thus may result in less wavelengths being used to facilitate the adding and dropping of signals between nodes in the ring. For example, wavelength conversion is not required when all connections between any two nodes are not routed through termination node 655 in the absence of failures. In this case, termination node 655 terminates or otherwise suppresses all wavelengths from both optical fibers 660 and 661. If there is a failure in the ring and loop back switching is initiated to isolate the failure, then termination node only passes those wavelengths that have not yet passed their destination nodes.

Figure 13:
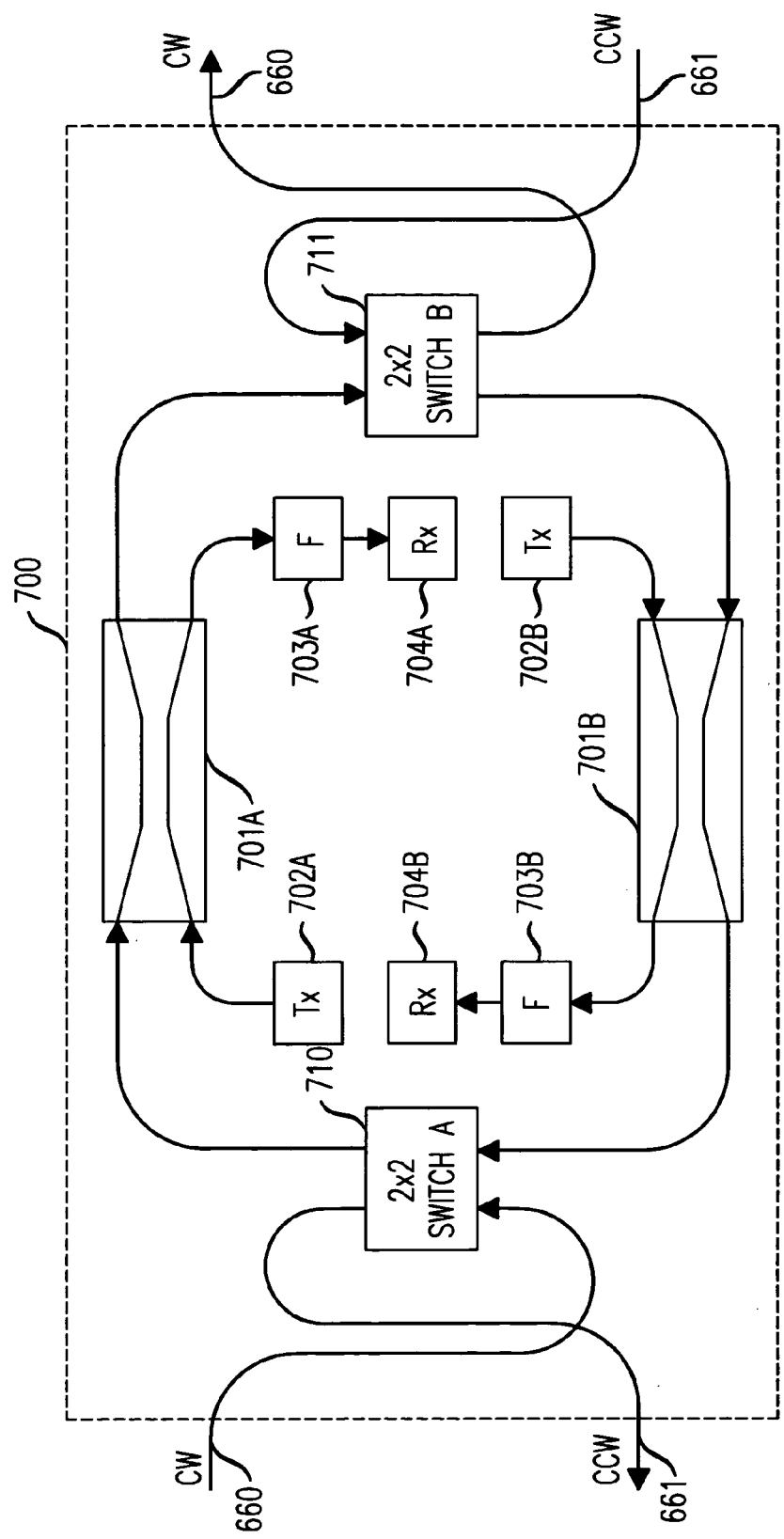
FIG. 13 shows an exemplary embodiment of an add/drop arrangement using the broadband coupler of FIG. 3 in the 2F-BLSR network of FIGS. 11 and 12.

FIG. 13 shows one illustrative embodiment of a broadband coupler-based add/drop arrangement 700 that may be employed at nodes 651–653 in 2F-BLSR 650 from FIGS. 11 and 12. The structure and operation of add/drop arrangement 700 in FIG. 13 is similar to that previously described for FIG. 10 except that an additional broadband coupler and corresponding components for adding and dropping individual optical channels are used. In particular, add/drop arrangement 700 includes a pair of broadband couplers 701A–701B, a pair of optical transmitters 702A–702B, a pair of optical filters 703A–703B, a pair of optical receivers 704A–704B, and a pair of optical switches 710 and 711, for coupling to optical fibers 660 and 661. The additional coupler 701B and its associated transmitter 702B, filter 703B, and receiver 704B are used, for example, because signals may be added and dropped from the working bandwidth of both optical fibers 660 and 661. As in the preceding embodiments, switches 710–711 will operate in a cross-bar state when the ring is in normal operation (e.g., no failures). Similarly, optical switches 710–711 will change states for carrying out the loop back functions, e.g., bar state and cross-bar state, depending on the location of the fault relative to the node.

EXAMPLE 4

4-Fiber Bi-directional Line-Switched Ring

Another well-known optical ring network architecture is the so-called 4-fiber bi-directional line-switched ring (4F-BLSR), the structure and operation of which are well-known to those skilled in the art. Briefly, the 4F-BLSR is similar in operation to the 2F-BLSR except that a separate optical fiber is dedicated for each of the following traffic flows: working traffic in clockwise direction; working traffic in counter-clockwise direction; protection traffic in clockwise direction; and protection traffic in counter-clockwise direction.

FIGS. 14A–14B illustrate traffic flow in an exemplary 4-fiber bi-directional line-switched ring (4F-BLSR) 800 during normal conditions while FIGS. 15A–15B illustrate traffic flow when there is a fault in the ring. As shown, nodes 801–804 are interconnected in a ring configuration via optical fiber 810 (clockwise working path), optical fiber 811 (counter-clockwise working path), optical fiber 820 (clockwise protection path), and optical fiber 821 (counter-clockwise protection path). For reasons that will be described in further detail below, the clockwise and counter-clockwise working paths, optical fibers 810 and 811 respectively, do not form a closed ring. However, the clockwise and counter-clockwise protection paths, optical fibers 820 and 821 respectively, do form a closed ring.

In FIG. 14A, node 802 (node B) sends data in the clockwise direction to node 803 (node C) via optical channel $\lambda_1$ using the clockwise working fiber 810. In FIG. 14B, node C sends data in counter-clockwise working fiber 811 to node B via optical channel $\lambda_1$. For simplicity of illustration, only the optical channels actually being added and dropped at the selected nodes are shown by the dotted arrows in the ring even though the composite WDM signal propagates around the ring. WDM signals may be added and dropped in 4F-BLSR 800 (e.g., optical channels $\lambda_1$ between nodes B and C) using a broadband coupler-based add/drop arrangement (not shown) as described in the preceding embodiments.

One significant difference in operation from the other embodiments relates to the termination and conversion of wavelengths. In particular, because clockwise working fiber 810 and counter-clockwise working fiber 811 do not form closed rings, no special termination node is required in 4F-BLSR 800. Instead, interference is avoided simply by not connecting the working fibers between a pair of nodes on the ring, e.g., working fibers 810 and 811 between node A (801) and node D (804), thereby creating an "open segment". For example, the remaining optical signal power in optical channel $\lambda_1$, which propagates around the ring after being tapped off in a respective node (e.g., node C for clockwise working fiber 810 and node B for counter-clockwise working fiber 811), is simply terminated at the respective ends of the fibers as shown. This embodiment is meant to be illustrative only. Consequently, other means for terminating or otherwise suppressing optical channels of a particular wavelength at the ends of the working fibers will be apparent to those skilled in the art. It should also be noted that wavelength conversion is not required and only one wavelength is required for a full duplex connection between any two nodes on 4F-BLSR 800.

FIGS. 15A and 15B illustrate the operation of 4F-BLSR 800 in the event of failure 825 between nodes B and C, with FIG. 15A showing communications from node B to node C and FIG. 15B showing communications from node C to node B. In general, loop back switching is used in a similar manner as previously described for the preceding examples with some differences that will be noted below. In this particular example, both nodes B and C implement loop back switching in response to failure 825.

In FIG. 15A, node B, which is in the loop back switch mode, routes the WDM optical signal (including optical channel $\lambda_1$) from clockwise working fiber 810 onto counter-clockwise protection fiber 821. The WDM optical signal (including optical channel $\lambda_1$) propagates around the ring as shown. At node C, the WDM optical signal is looped back from counter-clockwise protection fiber 821 back onto clockwise working fiber 810. Using the broadband coupler-based arrangement (not shown) according to the principles of the invention, traffic carried in optical channel $\lambda_1$ is then dropped at node C. The remaining optical signal power in optical channel $\lambda_1$ of the WDM optical signal in clockwise working fiber 810 is then terminated as previously described.

Similarly, in FIG. 15B, node C, which is in the loop back switch mode, routes the WDM optical signal (including optical channel $\lambda_1$) from counter-clockwise working fiber 811 onto clockwise protection fiber 820. The WDM optical signal (including optical channel $\lambda_1$) propagates around the ring as shown. At node B, the WDM optical signal is looped back from clockwise protection fiber 820 back onto counter-clockwise working fiber 811. Using the broadband coupler-based arrangement (not shown) according to the principles of the invention, traffic carried in optical channel $\lambda_1$ is then dropped at node B. The remaining optical signal power in optical channel $\lambda_1$ of the WDM optical signal in counter-clockwise working fiber 811 is then terminated as previously described. Using well-known techniques, span switching can also be used in lieu of loop back switching in the 4F-BLSR.

Figure 16:
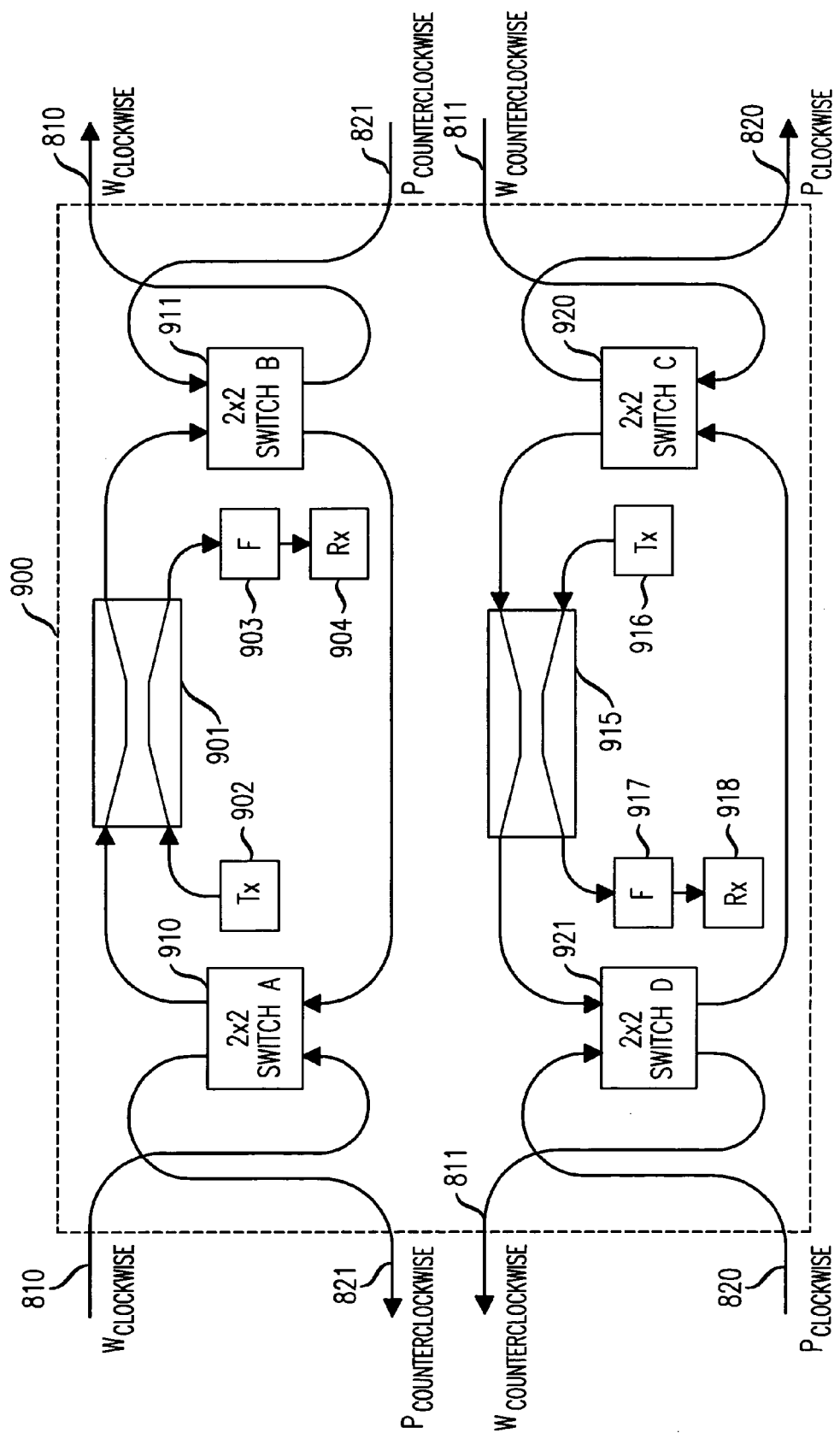
FIG. 16 shows an exemplary embodiment of an add/drop arrangement using the broadband coupler of FIG. 3 in the 4F-BLSR network of FIGS. 14 and 15.

FIG. 16 shows one illustrative embodiment of a broadband coupler-based add/drop arrangement 900 that may be employed at nodes 801–804 in 4F-BLSR 800 from FIGS. 14 and 15. The structure and operation of add/drop arrangement 900 in FIG. 16 is similar to that previously described for FIGS. 10 and 13 except for differences relating to the loop back switching function described above. For example, to facilitate loop back switching between the clockwise working fiber 810 and counter-clockwise protection fiber 821, the add/drop arrangement includes a pair of switches 910–911, broadband coupler 901, and associated transmitter 902, filter 903, and receiver 904. Similarly, to facilitate loop back switching between the counter-clockwise working fiber 811 and clockwise protection fiber 820, the add/drop arrangement includes a pair of switches 920–921, broadband coupler 915 and associated transmitter 916, filter 917, and receiver 918.

As in the preceding embodiments, switches 910–911 and 920–921 will operate in a cross-bar state when the ring is in normal operation (e.g., no failures). Similarly, switches 910–911 and 920–921 will change states for carrying out the loop back functions, e.g., bar state and cross-bar state, depending on the location of the fault relative to the node. As such, the operation as well as the flow of traffic in the various directions in add/drop arrangement 900 follows the same basic principles described in the preceding embodiments.

The foregoing is merely illustrative of the principles of the invention. Those skilled in the art will be able to devise numerous arrangements, which, although not explicitly shown or described herein, nevertheless embody principles that are within the spirit and scope of the invention. For example, the add/drop arrangement according to the principles of the invention may be applied in optical ring architectures other than the illustrative embodiments specifically shown and described herein (e.g., different ring topologies, different number of nodes, etc.). The principles of the invention are also equally applicable to optically amplified networks as well as those networks which may not include optical amplifiers. Additionally, those skilled in the art will recognize various combinations of optical and electronic components which may be substituted for the exemplary structures described herein for carrying out the add/drop and protection switching functions. Accordingly, the scope of the invention is limited only by the claims that follow.

What is claimed is:

1. An add/drop arrangement capable of adding/dropping at least one optical channel of a wavelength division multiplexed (WDM) signal in a WDM ring network having a plurality of nodes connected over an optical fiber facility, the arrangement comprising:

in at least one of the plurality of nodes
a broadband optical coupler including
a first input coupled to the optical fiber facility for receiving the WDM signal,
a first output for passing a tapped first portion of optical signal power of the WDM signal, and
a second output for passing a second portion of optical signal power of the WDM signal to the WDM ring network,
a receiver coupled to the first output, the receiver capable of extracting at least one optical channel from the tapped first portion, and
a transmitter coupled to a second input of the broadband optical coupler, the transmitter capable of supplying an optical channel to be added to the WDM signal; and in a single central node in the WDM ring network, a means for preventing re-circulation of an optical channel to substantially reduce interference between optical channels transported between any of the plurality of nodes in the WDM ring network, the means for preventing including a wavelength termination element operable to terminate a selected optical channel when the selected optical channel has already passed a node at which the selected optical channel was extracted.

2. The add/drop arrangement according to claim 1, wherein the means for preventing re-circulation includes a wavelength conversion element.

3. The add/drop arrangement according to claim 2, wherein the wavelength conversion element is operable to convert a selected optical channel of a first wavelength to a second wavelength in the event that the selected optical channel of the first wavelength passes the node including the wavelength conversion element before passing a node at which the selected optical channel is to be extracted.

4. The add/drop arrangement according to claim 2, wherein the central node further includes:

at least one optical demultiplexer having an input coupled to the optical fiber facility and a plurality of outputs, wherein the at least one optical demultiplexer separates the WDM signal into individual optical channels; and at least one optical multiplexer having a plurality of inputs, the at least one optical multiplexer combining the individual optical channels into a composite WDM signal and supplying the composite WDM signal to the optical fiber facility, wherein the wavelength conversion element is coupled between selected outputs of the at least one optical demultiplexer and selected inputs of the at least one optical multiplexer, and wherein the wavelength termination element is coupled to selected outputs of the at least one optical demultiplexer.

5. The add/drop arrangement according to claim 1, wherein the receiver further includes an optical filter for filtering an optical channel of a particular wavelength from the WDM signal.

6. The add/drop arrangement according to claim 1, wherein the WDM ring network is configured in a network topology selected from the group consisting of a uni-directional path-switched ring, a uni-directional line-switched ring, a 2-fiber bi-directional line-switched ring, and a 4-fiber bi-directional line-switched ring.

7. The arrangement according to claim 1, further comprising:

an optical-to-electrical conversion circuit coupled between the first output of the broadband optical coupler and the receiver, the conversion circuit being operable to convert the optical channel to be extracted from the wavelength division multiplexed signal to an electrical signal; and a subtraction circuit coupled to the conversion circuit and to the transmitter, the subtraction circuit for electrically subtracting an electrical signal corresponding to the optical channel to be added from the electrical signal corresponding to the optical channel to be extracted, such that feed-through from the optical channel to be added is substantially reduced.

8. In a wavelength division multiplexed (WDM) ring system including a plurality of nodes connected over an optical fiber facility, a method for adding/dropping at least one optical channel of a WDM signal, wherein an optical channel carrying traffic is transported from a first node to a second node, the method comprising:

at the second node, tapping off a portion of the optical signal power of the WDM signal using a broadband optical coupler, extracting the optical channel carrying traffic from the tapped portion of the WDM signal, and supplying an optical channel to be added to the WDM signal via the broadband optical coupler; and at a single central node in the WDM ring system, preventing re-circulation of the optical channel carrying traffic in the WDM ring system, thereby substantially reducing interference between optical channels in the WDM signal, including converting a selected optical channel of a first wavelength to a second wavelength when the selected optical channel passes the central node before passing the second node, the central node being further operable to prevent re-circulation of optical channels transported between any of the plurality of nodes in the WDM ring system.

9. The method according to claim 8, wherein preventing re-circulation includes substantially terminating a remaining portion of optical signal power in the optical channel that was extracted at the second node.

10. A wavelength division multiplexed (WDM) ring system including a single central node and a plurality of ring nodes connected over an optical fiber facility, the system further comprising:

at one of the plurality of ring nodes, a broadband optical coupler including a first input coupled to the optical fiber facility for receiving a wavelength division multiplexed signal having a plurality of optical channels, a second input coupled to an add path for receiving an optical channel to be added to the wavelength division multiplexed signal, a first output coupled to a drop path for supplying the wavelength division multiplexed signal at a first optical signal power level so that at least one optical channel can be dropped from the WDM signal, and a second output coupled to the optical fiber facility for supplying both the wavelength division multiplexed signal at a second optical signal power level and the added optical channel; and at the central node, a means for preventing re-circulation of an optical channel to substantially reduce interference between optical channels transported in the WDM ring network including a wavelength termination element operable to terminate a selected optical channel when the selected optical channel has already passed a node at which the selected optical channel was dropped, the central node being further operable to prevent re-circulation circulation of optical channels transported between any of the plurality of nodes in the WDM ring system.

11. The system according to claim 10, wherein the means for preventing recirculation includes a wavelength conversion element.

12. The system according to claim 11, wherein the wavelength conversion element is operable to convert a selected optical channel of a first wavelength to a second wavelength in the event that the selected optical channel of the first wavelength passes the central node before passing a node at which the selected optical channel is to be dropped.

13. The system according to claim 10, further comprising:

an optical filter coupled to the drop path for removing an optical channel of a particular wavelength from the wavelength division multiplexed signal;

an optical receiver for receiving and processing the optical channel removed by the optical filter; and an optical transmitter coupled to the add path for transmitting an optical channel to be added to the wavelength division multiplexed signal.

14. A method for adding/dropping at least one optical channel of a wavelength division multiplexed (WDM) signal in a uni-directional path switched ring network having a plurality of nodes connected via a working optical fiber and a protection optical fiber, wherein the WDM signal is transported from a first node to a second node in each of the working and protection optical fibers, the method comprising:

at the first node, bridging an optical channel carrying traffic for the second node onto each of the working and protection optical fibers;

at the second node, tapping off a portion of the optical signal power of the WDM signal from each of the working and protection optical fibers using a broadband optical coupler, optically filtering the optical channel carrying traffic from the tapped portion of the WDM signal in each of the working and protection optical fibers, selecting one of the filtered optical channels from the working and protection optical fibers, dropping the selected optical channel, and supplying an optical channel to be added to the WDM signal via the broadband optical coupler; and preventing re-circulation of an optical channel to substantially reduce interference between optical channels transported in the uni-directional path switched ring network.

15. A method according to claim 14, wherein the optical channel carrying traffic is bridged onto each of the working and protection optical fibers at the same wavelength.

16. A method according to claim 14, wherein the optical channel carrying traffic is bridged onto the working optical fiber at a first wavelength and onto the protection optical fiber at a second wavelength.

17. A method according to claim 14, wherein preventing re-circulation comprises, at a central node, converting the wavelength of the optical channel carrying traffic in at least one of the working and protection optical fibers from a first wavelength to a second wavelength if the optical channel of the first wavelength will pass the central node before passing the second node.

18. A method according to claim 14, wherein preventing re-circulation comprises, at a central node, substantially terminating a remaining portion of optical signal power in the optical channel carrying traffic if the optical channel carrying traffic has already passed the second node, such that re-circulation of the optical channel carrying traffic in the ring network is prevented.

19. An arrangement for adding/dropping at least one optical channel of a wavelength division multiplexed signal in a uni-directional path-switched ring network having a plurality of nodes connected via a working optical fiber and a protection optical fiber, wherein an optical channel carrying traffic from a first node to a second node is transported in the WDM signal in each of the working and protection optical fibers, the arrangement comprising, at the second node:

a first broadband optical coupler coupled to the working optical fiber and a second broadband coupler coupled to the protection optical fiber, each broadband coupler including a first input for receiving the WDM signal from the respective working and protection optical fibers, a first output for passing a tapped first portion of optical signal power of the WDM signal, and a second output for passing a second portion of optical signal power of the WDM signal to the WDM ring network via the respective working and protection optical fibers, a first optical filter coupled to the first output of the first broadband optical coupler and a second optical filter coupled to the first output of the second broadband optical coupler, each of the first and second optical filters capable of filtering, from the respective tapped first portions, the optical channel carrying traffic;

a switching arrangement coupled to the first and second optical fibers for selecting, from among the working and protection optical fibers, one of the optical channels carrying traffic; and in at least one of the plurality of nodes, a means for preventing re-circulation of an optical channel to substantially reduce interference between optical channels transported in the WDM ring network.

20. The arrangement according to claim 19, further comprising at least one transmitter coupled to a second input at each of the first and second broadband optical couplers, the at least one transmitter capable of supplying an optical channel to be added to the WDM signal in each of the working and protection optical fibers.

21. The arrangement of claim 19, wherein the switching arrangement is selected from the group consisting of an optical switching arrangement and an electrical switching arrangement.

22. The arrangement of claim 21, wherein the electrical switching arrangement comprises:

at least one optical-to-electrical conversion circuit for converting the optical channel carrying traffic supplied in each of the working and protection optical fibers to an electrical signal; and an electrical switch for selecting one of the electrical signals.

23. A method of adding/dropping at least one optical channel of a wavelength division multiplexed (WDM) signal in a uni-directional line-switched ring network having a plurality of nodes connected via a working optical fiber and a protection optical fiber, wherein an optical channel carrying traffic is transported from a first node to a second node in the WDM signal, the method comprising:

in a normal mode of operation, routing the WDM signal from the first node to the second node in the working optical fiber;

in the presence of a failure in the ring network causing nodes adjacent to the failure to implement loop back switching, routing the WDM signal from the first node to the second node using both the working and protection optical fibers; and at the second node, tapping off a portion of the optical signal power of the WDM signal from whichever of the working and protection optical fibers is transporting the WDM signal using a broadband optical coupler, extracting the optical channel carrying traffic from the tapped portion of the WDM signal, supplying an optical channel to be added to the WDM signal via the broadband optical coupler; and preventing re-circulation of an optical channel to substantially reduce interference between optical channels transported in the uni-directional line-switched ring network.

24. A method according to claim 23, wherein preventing re-circulation comprises, at a central node, converting the wavelength of the optical channel carrying traffic from a first wavelength to a second wavelength if the optical channel of the first wavelength will pass the central node before passing the second node.

25. A method according to claim 23, wherein preventing re-circulation comprises, at a central node, substantially terminating a remaining portion of optical signal power in the optical channel carrying traffic if the optical channel carrying traffic has already passed the second node, such that re-circulation of the optical channel carrying traffic in the ring network is prevented.

26. An arrangement for adding/dropping at least one optical channel of a wavelength division multiplexed (WDM) signal in a uni-directional line-switched ring network having a plurality of nodes connected via a working optical fiber and a protection optical fiber, wherein the WDM signal is transported from a first node to a second node in the working optical fiber in a normal mode of operation, and in both the working and protection optical fibers in the presence of a failure in the ring network that causes nodes adjacent to the failure to implement loop back switching, the arrangement comprising, at the second node:
  a broadband coupler including
    a first input for receiving the WDM signal from whichever of the working and protection optical fibers is transporting the WDM signal, and
    a first output for passing a tapped first portion of optical signal power of the WDM signal,
  an optical filter for removing an optical channel carrying traffic from the first node to the second node from the tapped first portion of the WDM signal;
  an optical switching arrangement coupled to the broadband optical coupler and to each of the working and protection optical fibers, the optical switching arrangement operable in a normal mode to route the WDM signal through the broadband optical coupler and the working optical fiber, the optical switching arrangement being further operable in a loop back switching mode, in the presence of the failure in the ring network, to switch the WDM signal through the broadband optical coupler and both the working and protection optical fibers; and
  in at least one of the plurality of nodes, a means for preventing re-circulation of an optical channel to substantially reduce interference between optical channels transported in the unidirectional line-switched ring network.

27. The arrangement according to claim 26, further comprising a transmitter coupled to a second input of the broadband optical coupler, the transmitter capable of supplying an optical channel to be added to the WDM signal.

28. A method of adding/dropping at least one optical channel of a wavelength division multiplexed (WDM) signal in a bi-directional line-switched ring network having a plurality of nodes connected via a first optical fiber and a second optical fiber, the first and second optical fibers each including working and protection bandwidth, wherein the WDM signal is transported from a first node to a second node, the method comprising:
  in a normal mode of operation, routing the WDM signal from the first node to the second node in the working bandwidth of the first optical fiber;
  in the presence of a failure in the ring network causing nodes adjacent to the failure to implement loop back switching, routing the WDM signal from the first node to the second node using the working bandwidth of the first optical fiber and the protection bandwidth of the second optical fiber;
  at the second node,
    using a broadband optical coupler, tapping off a portion of the optical signal power of the WDM signal from whichever of the working and protection bandwidth is transporting the WDM signal,
    extracting an optical channel carrying traffic from the tapped portion of the WDM signal, and
    supplying an optical channel to be added to the WDM signal via the broadband optical coupler; and
  preventing re-circulation of an optical channel to substantially reduce interference between optical channels transported in the bi-directional line-switched ring network.

29. A method according to claim 28, wherein preventing re-circulation comprises, at a central node, converting the wavelength of the optical channel carrying traffic from a first wavelength to a second wavelength if the optical channel of the first wavelength will pass the central node before passing the second node.

30. A method according to claim 28, further comprising, at a central node, substantially terminating a remaining portion of optical signal power in the optical channel carrying traffic if the optical channel carrying traffic has already passed the second node, such that re-circulation of the optical channel carrying traffic in the ring network is prevented.

31. An arrangement for adding/dropping at least one optical channel of a wavelength division multiplexed (WDM) signal in a bi-directional line-switched ring network having a plurality of nodes connected via a first optical fiber and a second optical fiber, the first and second optical fibers each including working and protection bandwidth, wherein the WDM signal is transported from a first node to a second node in the working optical fiber in a normal mode of operation, and in both the working and protection optical fibers in the presence of a failure in the ring network that causes nodes adjacent to the failure to implement loop back switching, the arrangement comprising, at the second node:
  a first and second broadband optical coupler, each including
    a first input for receiving the WDM signal from whichever of the respective working and protection bandwidth of the first and second optical fibers is transporting the WDM signal, and
    a first output for passing a tapped first portion of optical signal power of the WDM signal, and
  a first optical filter coupled to the first output of the first broadband optical coupler and a second optical filter coupled to the first output of the second broadband optical coupler, each of the first and second optical filters capable of filtering, from the respective tapped first portions, the optical channel carrying traffic;
  an optical switching arrangement coupled to the broadband optical coupler and to each of the first and second optical fibers, the optical switching arrangement operable in a normal mode to route the WDM signal through the respective first and second broadband optical couplers and the working bandwidth of the respective first and second optical fibers, the optical switching arrangement being further operable in a loop back switching mode, in the presence of the failure in the ring network, to switch the WDM signal through the respective first and second broadband optical couplers and the working and protection bandwidth of the respective first and second optical fibers; and
  in at least one of the plurality of nodes, a means for preventing re-circulation of an optical channel to substantially reduce interference between optical channels transported in the bi-directional line-switched ring network.

32. A method of adding/dropping at least one optical channel of a wavelength division multiplexed (WDM) signal in a bi-directional line-switched ring network having a plurality of nodes connected via a first optical fiber in a clockwise working path, a second optical fiber in a counter-clockwise working path, a third optical fiber in a clockwise protection path, and a fourth optical fiber in a counter-clockwise protection path, the first and second optical fibers each having an open segment, wherein the WDM signal is transported from a first node to a second node, the method comprising:

in a normal mode of operation, routing the WDM signal from the first node to the second node in one of the first and second optical fibers;

in the presence of a failure in the ring network causing nodes adjacent to the failure to implement loop back switching, routing the WDM signal from the first node to the second node using whichever of the combinations, the first and fourth optical fibers or the second and third optical fibers, is active;

at the second node,
  using a broadband optical coupler, tapping off a portion of the optical signal power of the WDM signal from whichever of the optical fibers is carrying the WDM signal,
  extracting an optical channel carrying traffic from the tapped portion of the WDM signal, and
  supplying an optical channel to be added to the WDM signal via the broadband optical coupler; and when the optical channel carrying traffic has already passed the second node, routing the remaining portion of optical signal power in the optical channel carrying traffic to the open segment of one of the first and second optical fibers, thereby preventing re-circulation of the optical channel carrying traffic in the ring network.

33. An arrangement for adding/dropping at least one optical channel of a wavelength division multiplexed (WDM) signal in a bi-directional line-switched ring network having a plurality of nodes connected via a first optical fiber in a clockwise working path, a second optical fiber in a counter-clockwise working path, a third optical fiber in a clockwise protection path, and a fourth optical fiber in a counter-clockwise protection path, the first and second optical fibers each having an open segment, wherein the WDM signal is transported from a first node to a second node, the arrangement comprising, at the second node:

a first broadband coupler for tapping off a portion of the optical signal power of the WDM signal from the first and fourth optical fibers;

a transmitter coupled to the first broadband coupler for supplying an optical channel to be added to the WDM signal;

a filter coupled to the first broadband coupler for filtering an optical channel to be dropped from the tapped portion of the WDM signal;

a first pair of optical switches, each being coupled to the first and fourth optical fibers and to the first broadband coupler, the first pair of switches both being operable in a first state to route the WDM signal in the clockwise working path, at least one of the first pair of switches being further operable in a second state to route the WDM signal between the clockwise working path and the counter-clockwise protection path in a loop back switching mode when a failure occurs in the ring network;

a second broadband coupler for tapping off a portion of the optical signal power of the WDM signal from the second and third optical fibers;

a transmitter coupled to the second broadband coupler for supplying an optical channel to be added to the WDM signal;

a filter coupled to the second broadband coupler for filtering an optical channel to be dropped from the tapped portion of the WDM signal; and a second pair of optical switches, each being coupled to the second and third optical fibers and to the second broadband coupler, the pair of switches both being operable in a first state to route the WDM signal in the counter-clockwise working path, at least one of the second pair of switches being further operable in a second state to route the WDM signal between the counter-clockwise working path and the clockwise protection path in a loop back switching mode when a failure occurs in the ring network, wherein the open segment in each of the first and second optical fibers is operable to prevent re-circulation of the WDM signal.

* * * * *